(12) United States Patent
Ryu et al.

(10) Patent No.: US 11,576,165 B2
(45) Date of Patent: Feb. 7, 2023

(54) METHOD AND APPARATUS FOR TRANSMITTING AND RECEIVING DOWNLINK CONTROL INFORMATION IN A WIRELESS COMMUNICATION SYSTEM

(71) Applicant: Samsung Electronics Co., Ltd., Suwon-si (KR)

(72) Inventors: Hyunseok Ryu, Yongin-si (KR); Peng Xue, Suwon-si (KR); Anil Agiwal, Suwon-si (KR); Namjeong Lee, Suwon-si (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/984,049

(22) Filed: Aug. 3, 2020

(65) Prior Publication Data

US 2020/0367213 A1 Nov. 19, 2020

Related U.S. Application Data

(63) Continuation of application No. 15/674,460, filed on Aug. 10, 2017, now Pat. No. 10,736,088.

(30) Foreign Application Priority Data

Aug. 11, 2016 (KR) ........................ 10-2016-0102598

(51) Int. Cl.
- *H04W 72/04* (2009.01)
- *H04W 72/12* (2009.01)
- *H04L 5/00* (2006.01)

(52) U.S. Cl.
CPC ............. *H04W 72/042* (2013.01); *H04L 5/00* (2013.01); *H04L 5/0044* (2013.01);
(Continued)

(58) Field of Classification Search
CPC .. H04W 72/042; H04W 72/1289; H04L 5/00; H04L 5/0044; H04L 5/0053; H04L 5/0094
See application file for complete search history.

(56) References Cited

U.S. PATENT DOCUMENTS

| 2013/0136098 A1 | 5/2013 | Li et al. |
| 2013/0194931 A1 | 8/2013 | Lee et al. |

(Continued)

FOREIGN PATENT DOCUMENTS

| KR | 10-2014-0079967 A | 6/2014 |
| WO | 2014/098378 A1 | 6/2014 |

(Continued)

OTHER PUBLICATIONS

ISA/KR, International Search Report for International Application No. PCT/KR2017/008666, dated Nov. 20, 2017, 3 pages.

(Continued)

*Primary Examiner* — Donald L Mills

(57) ABSTRACT

The present disclosure relates to a communication method and system for converging a 5th-generation (5G) communication system for supporting higher data rates beyond a 4th-generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

In detail, an information transmission method of a base station in a wireless communication system according to the present disclosure includes: generating control channel monitoring information for monitoring a control channel of at least one of a first terminal using a first transmission time interval (TTI) or a second terminal using a second TTI; and
(Continued)

transmitting the control channel monitoring information. In this case, the first terminal may support a first bandwidth or a second bandwidth and the second terminal may support the first bandwidth or a third bandwidth.

16 Claims, 26 Drawing Sheets

(52) U.S. Cl.
CPC .......... *H04L 5/0053* (2013.01); *H04L 5/0094* (2013.01); *H04W 72/1289* (2013.01); *H04L 5/0007* (2013.01); *H04W 72/044* (2013.01); *H04W 72/0446* (2013.01)

(56) References Cited

U.S. PATENT DOCUMENTS

| | | | |
|---|---|---|---|
| 2014/0146799 A1* | 5/2014 | Park | H04W 72/042 370/336 |
| 2014/0269594 A1 | 9/2014 | Jang et al. | |
| 2015/0280871 A1 | 10/2015 | Xu et al. | |
| 2015/0334769 A1 | 11/2015 | Kim et al. | |
| 2015/0358962 A1 | 12/2015 | Lee et al. | |
| 2017/0303250 A1* | 10/2017 | Shao | H04W 72/042 |
| 2017/0325164 A1 | 11/2017 | Lee et al. | |
| 2017/0332377 A1* | 11/2017 | Tseng | H04W 72/0413 |
| 2017/0332397 A1* | 11/2017 | Li | H04L 1/1887 |
| 2017/0367046 A1* | 12/2017 | Papasakellariou | H04L 5/0048 |
| 2018/0007733 A1 | 1/2018 | Mochizuki et al. | |
| 2018/0213468 A1* | 7/2018 | Chatterjee | H04W 48/10 |
| 2018/0242318 A1 | 8/2018 | Christensson et al. | |
| 2018/0242389 A1 | 8/2018 | Phuyal et al. | |
| 2019/0053197 A1* | 2/2019 | Kim | H04W 72/12 |
| 2019/0223204 A1 | 7/2019 | Kim et al. | |
| 2020/0092874 A1* | 3/2020 | Kim | H04W 72/12 |

FOREIGN PATENT DOCUMENTS

| | | |
|---|---|---|
| WO | 2014/109621 A1 | 7/2014 |
| WO | 2016/064048 A1 | 4/2016 |
| WO | 2016114215 A1 | 7/2016 |
| WO | 2017/078373 A1 | 5/2017 |
| WO | 2018/004246 A1 | 1/2018 |

OTHER PUBLICATIONS

KT Corp, et al., "Discussion on NR numerology," R1-165525, 3GPP TSG RAN WG1 Meeting #8 5, Nanjing, China, May 23-27, 2016, 7 pages.
Nokia, et al., "Scheduling framework and related requirements," R1-165023, 3GPP TSG-RAN WG1 #85, Nanjing, P. R. China, May 23-27, 2016, 6 pages.
ZTE Corporation, et al., "Discussion on Control Channel Design for NR MIMO," R1-165038, 3GPP TSG RAN WG1 Meeting #85, Nanjing, China, May 23-27, 2016, 6 pages.
European Patent Office, Extended European Search Report regarding Application No. 17839821.0, dated Feb. 7, 2020, 9 pages.
Office Action dated Aug. 10, 2021, in connection with Korean Application No. 10-2017-0098713, 10 pages.
Notice of Reasons for Refusal dated Aug. 10, 2021, in connection with Japanese Application No. 2019-507774, 7 pages.
Intel Corporation, "Remaining details of M-PDCCH design," R1-155299, 3GPP TSG-RAN WG1 Meeting #82bis, Malmo, Sweden, Oct. 5-9, 2015, 5 pages.
Intellectual Property India, "Examination repod under sections 12 & 13 of the Patents Act" dated Nov. 16, 2021, in connection with India Patent Application No. 201947005088, 5 pages.
Korean Intellectual Property Office, "Decision of Patent" dated Dec. 3, 2021, in connection with Korean Patent Application No. 10-2017-0098713, 4 pages.
European Patent Office, "Communication pursuant to Article 94(3) EPC" dated Nov. 30, 2021, in connection with European Patent Application No. 17 839 821.0, 6 pages.
ZTE Corporation et al., "On forward compatibility for new radio intedace", 3GPP TSG RAN WG1 Meeting #85, R1-164292, Nanjing, China, May 23-27, 2016, 7 pages.

* cited by examiner

FIG 2A
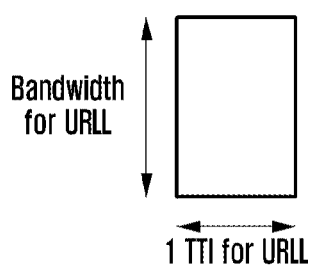
FIG 2B
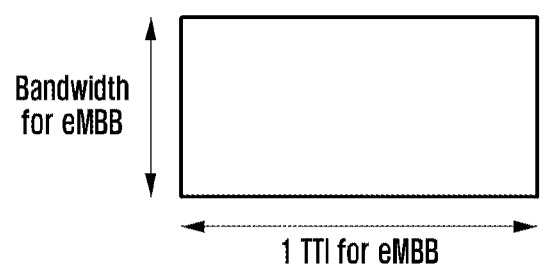
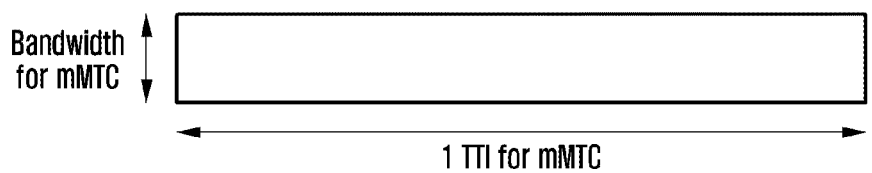
FIG 2C

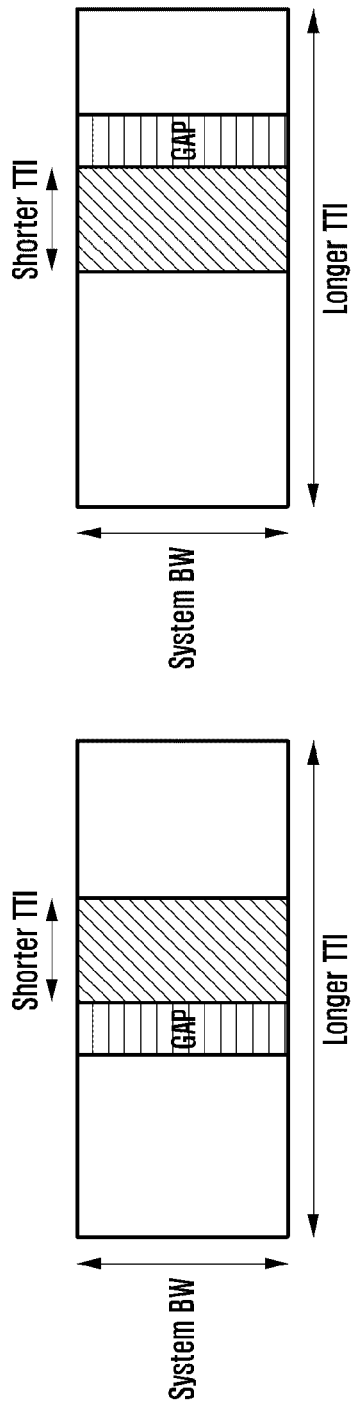
FIG. 4A
FIG. 4B
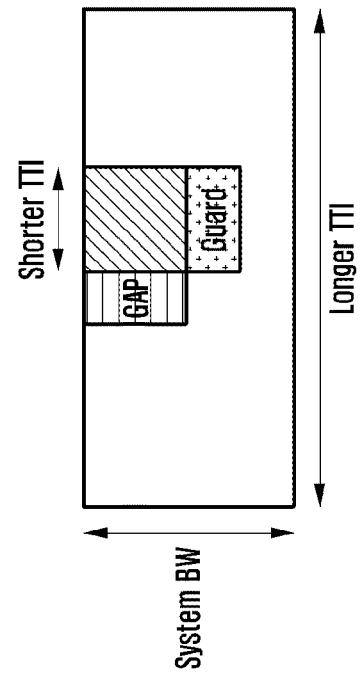
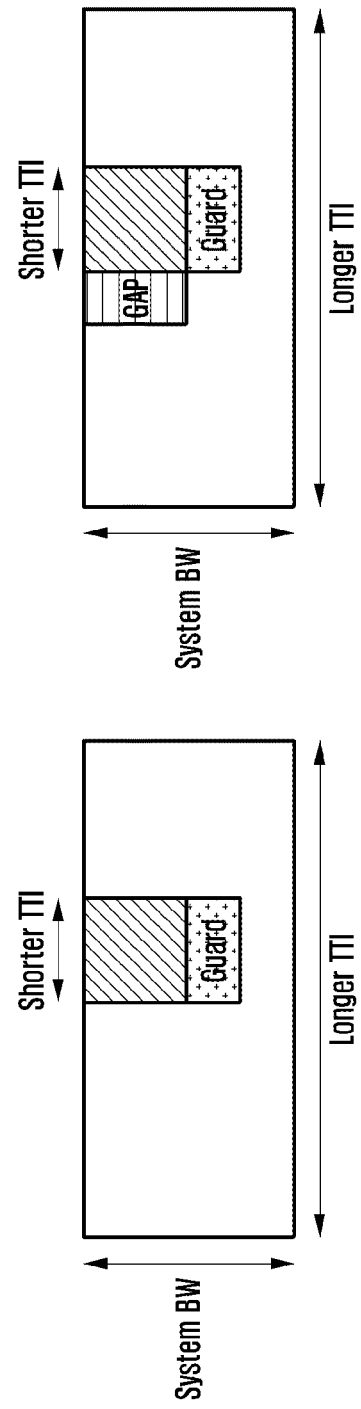
FIG. 4C
FIG. 4D

METHOD AND APPARATUS FOR TRANSMITTING AND RECEIVING DOWNLINK CONTROL INFORMATION IN A WIRELESS COMMUNICATION SYSTEM

CROSS-REFERENCE TO RELATED APPLICATIONS

The present application is a continuation of U.S. patent application Ser. No. 15/674,460 filed on Aug. 10, 2017, which is based on and claims priority to Korean Application No. KR 10-2016-0102598 filed on Aug. 11, 2016, the disclosures of which are herein incorporated by reference in their entirety.

BACKGROUND

1. Field

Various embodiments of the present disclosure relate to a wireless communication system, and more particularly, to a method and an apparatus for transmitting and receiving downlink control information in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

Meanwhile, the operating method of the terminal for receiving the downlink control channel transmitted by the base station is not defined in the environment where various services capable of supporting the 5G communication system coexist, and therefore there is a need to define the operating method.

SUMMARY

To address the above-discussed deficiencies, it is a primary object to provide a method and an apparatus for efficiently receiving, by a terminal, a downlink control channel corresponding to the terminal's own service, if various services having different requirements coexist in one system which is one of features of a 5G communication system.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of an information transmission method of a base station in a wireless communication system, including: generating control channel monitoring information including at least one of information on a time base and information on a frequency base, for control channel monitoring of a terminal; and transmitting the control channel monitoring information.

Various embodiments of the present disclosure are directed to the provision of a control channel monitoring method of a terminal in a wireless communication system, including: receiving, from a base station, control channel monitoring information including at least one of information on a time base and information on a frequency base, for control channel monitoring of the terminal; and monitoring the control channel based on the control channel monitoring information.

Various embodiments of the present disclosure are directed to the provision of a base station for transmitting information in a wireless communication system, including: a transceiver transmitting and receiving a signal; and a processor performing a control to generate control channel monitoring information including at least one of information on a time base and information on a frequency base, for control channel monitoring of a terminal and transmit the control channel monitoring information.

Various embodiments of the present disclosure are directed to the provision of a terminal for monitoring a control channel in a wireless communication system, comprising: a transceiver transmitting and receiving a signal; and a processor performing a control to receive, from a base station, control channel monitoring information including at least one of information on a time base and information on a frequency base, for control channel monitoring of the terminal and monitor the control channel based on the control channel monitoring information.

According to the present disclosure, in the scenario where various services having different requirements coexist in one system, the terminal can efficiently receive the downlink control channel corresponding to the terminal's own service.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A to 2C illustrate an example of various TTIs for each service, according to an embodiment of the present disclosure.

FIGS. 4A to 4D illustrate another example of the case where the TTIs having the different lengths coexist in one system according to the embodiment of the present disclosure.

DETAILED DESCRIPTION

Figure 1A:
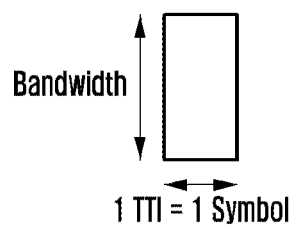
FIG. 1A to 1C illustrate an example of a definition of a TTI according to an embodiment of the present disclosure.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the present disclosure will be described in detail with reference to the accompanying drawings. In this case, it is noted that like reference numerals denote like elements in the accompanying drawings. Further, detailed descriptions related to well-known functions or configurations will be ruled out in order not to unnecessarily obscure the subject matter of the present disclosure.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect each component's real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be substantially simultaneously performed in fact or be performed in a reverse sequence depending on corresponding functions sometimes.

Here, the term "~unit" used in the present embodiment means software or hardware components such as FPGA and ASIC and the "~unit" performs any roles. However, the meaning of the "~unit" is not limited to software or hardware. The "~unit" may be configured to be in a storage medium that may be addressed and may also be configured to reproduce one or more processor. Accordingly, for example, the "~unit" includes components such as software components, object oriented software components, class components, and task components and processes, functions, attributes, procedures, subroutines, segments of program code, drivers, firmware, microcode, circuit, data, database, data structures, tables, arrays, and variables. The functions provided in the components and the "units" may be combined with a smaller number of components and the "units" or may further separated into additional components and "units". In addition, the components and the "units" may also be implemented to reproduce one or more CPUs within a device or a security multimedia card.

Efforts to develop an improved 5G communication system after the commercialization of the 4G communication system have been conducted.

The main feature of the 5G communication system is to support various service scenarios having different requirements compared to the 4G communication system. Here, the requirements may be latency, data rate, battery life, the number of concurrent users, coverage, and the like.

For example, the enhanced mobile broadband (eMBB) service aims at a data transmission rate that is 100 times or more high than that of the 4G communication system and may be regarded as a service for supporting fast growing user data traffic.

As another example, an ultra reliable and low latency (URLL) service aims at very high data transmission/reception reliability and very low latency compared to 4G communication system, and may be usefully used for an autonomous vehicle, an e-health, a drone, or the like.

As another example, a massive machine-type-communication (mMTC) service aims to support a larger number of device-to-device communications per single area than a 4G communication system, and is an evolved service of the 4G MTC such as smart metering.

The present disclosure relates to a method and apparatus for operating a terminal for receiving a downlink control channel transmitted by a base station in the environment where various services capable of supporting the 5G communication system coexist.

In a general cellular system (e.g., a long term evolution (LTE) system), a terminal receives a downlink control channel (physical downlink control channel (PDCCH)) transmitted from a base station.

The PDCCH is transmitted in a control channel region on a first, second, or third symbol of a head of a subframe every subframe (1 ms), and the control channel region is transmitted over the entire system bandwidth on a frequency base. For example, in a system with a bandwidth of 20 MHz, the control channel region for the PDCCH occupies the first, second, or third symbol of the head of the subframe on the time base and 20 MHz on the frequency base. As another example, in a system with a bandwidth of 5 MHz, the control channel region for the PDCCH occupies the first, second, or third symbol of the head of the subframe on the time base and 5 MHz on the frequency base. Downlink control information (DCI) such as resource allocation information of the terminal is transmitted to the PDCCH. The information on how many symbols are required for configuring the PDCCH is transmitted to the terminal through a separate physical control format indication channel (PCFICH).

The PDCCH is scrambled with various radio network temporary identification (RNTI) (or hereinafter, may be referred to as a radio identifier) according to the purpose, and is transmitted to the terminal. For example, P-RNTI is RNTI associated with paging, RA-RNTI is RNTI associated with a random access, SI-RNTI is RNTI associated with system information, and C-RNTI is RNT associated with downlink or uplink resource allocation. The terminal receives the PDCCH transmitted every subframe to perform descrambling through the RNTI and then decode the PDCCH.

In a wireless communication system, various services may coexist in one system. For example, a normal LTE cellular communication service, a device-to-device (D2D) communication service, a machine-type-communication (MTC) service, and a multicast broadcast multimedia service (MBMS) communication service, or the like may coexist. Since all different services use the same transmission time interval (TTI), the PDCCH is transmitted every TTI (1 TTI=1 subframe=1 ms).

On the other hand, the 5G communication system may consider the use of different TTIs for each service in order to satisfy different requirements for each service.

For example, in case of the URLL service, it may be possible to use a short TTI (e.g., 0.2 ms) to satisfy short latency requirements, and in case of the mMTC service, it is possible to use a longer TTI (e.g., 2 ms) in order to satisfy wide coverage requirements (the longer TTI may increase coverage because it may perform a long transmission with a lot of energy).

In the 5G, the TTI may consist of 1 symbol or 2 or more symbols, 1 slot or 2 slots, or 1 subframe or 2 or more subframes. When there are definitions of various TTIs or services using TTIs having different lengths in the same TTI definition coexist in one system, a need exists for a method for efficiently receiving, by a terminal, a PDCCH (or a PDCCH received by the terminal) corresponding to the terminal's own service, which has not yet been described in detail.

On the other hand, in a 5G communication system, one terminal may support a plurality of services. However, if different services use different TTIs or subcarrier spacing, complexity and cost of the terminal for decoding the same may be increased. Accordingly, in consideration of capability of the terminal, one terminal may be designed to support only one specific service. For example, a terminal with high capability may support all of the eMBB, the URLL, and the mMTC services. However, a terminal with low capability may support only one of the eMBB, the URLL, and the mMTC services. Accordingly, the use of different transmission/reception bandwidths may be considered to satisfy different requirements for each terminal (or for each service supported by the terminal). For example, even if the system bandwidth supports 20 MHz, the transmission/reception bandwidth of the terminal may support only 5 MHz, which is smaller than 20 MHz, to lower the complexity and cost of the terminal. As another example, a terminal supporting the mMTC (if a terminal supporting only one mMTC service and a terminal supporting a plurality of services transmits the mMTC service) may perform long transmission or reception (use of longer TTI) using a small transmission/reception bandwidth (e.g., 1.4 MHz) in order to satisfy the coverage requirements. At this time, the transmission bandwidth and the reception bandwidth of the terminal may not be the same. For example, the transmission bandwidth of the terminal may be 180 kHz and the reception bandwidth may be 1.4 MHz (transmission bandwidth<reception bandwidth). Alternatively, the transmission bandwidth of the terminal may be larger than the reception bandwidth of the terminal (transmission bandwidth>reception bandwidth).

As described above, the system bandwidth and the transmission/reception bandwidths used by the actual terminal may differ depending on the capabilities of the terminal or depending on the specific service supported by the terminal. In such a scenario, if the reception bandwidth used by the terminal is different from the system bandwidth (in particular, the reception bandwidth of the terminal<system bandwidth), the terminal may have trouble receiving the PDCCH transmitted over the entire system bandwidth. For example, if it is assumed that the system bandwidth is 20 MHz and the reception bandwidth of the terminal is 1.4 MHz, the PDCCH may be transmitted over the entire bandwidth of 20 MHz, such that the terminal may not receive the PDCCH transmission.

Embodiments of the present disclosure to be described below will propose configurations for solving the above-mentioned problem. That is, in a scenario in which various services having different requirements coexist in one system which is one of the features of the 5G communication system, a method for efficiently receiving, by a terminal, a downlink control channel corresponding to the terminal's own service will be described. In addition, in the scenario where the reception bandwidth of the terminal is different from the system bandwidth, a method of efficiently receiving, by a terminal, a downlink control channel corresponding to the terminal's own bandwidth will be described.

The present disclosure includes a method for transmission a downlink control channel for supporting these services if services using different TTI coexist in the 5G communication system. In addition, the present disclosure includes a method and an apparatus for operating a base station and a terminal for transmitting and receiving downlink control information.

The present disclosure includes a method and apparatus for operating a base station and a terminal for transmitting and receiving downlink control information if a system bandwidth is different from a reception bandwidth of a terminal, in a 5G communication system.

The terms used in the embodiments of the present disclosure to be described below may be defined as follows.

Each of the first service and the second service may mean a service that needs to satisfy different requirements. Here, the requirements may be latency, data rate, battery life, the number of concurrent users, coverage, and the like. Examples of the service may include the URLL, the eMBB, the mMTC, and the like.

A first TTI may mean a scheduling unit having a first time length (or symbol), and a second TTI may mean a scheduling unit having a second time length (or symbol). In this case, a first time length and a second time length may be different from each other. For example, in the present disclosure, the first TTI may be referred to as a shorter TTI and the second TTI may be referred to as a longer TTI, or vice versa.

The first terminal may mean a terminal that receives a first service and uses the first TTI, and the second terminal may mean a terminal that receives a second service and uses the second TTI. However, the present disclosure is not necessarily limited to such limitations. For example, the first terminal may receive the first service and use the second TTI, or the second terminal may receive the second TTI and use the first TTI.

In this case, the first terminal may support a first bandwidth or a second bandwidth. In addition, the second terminal may support the first bandwidth or a third bandwidth. The first bandwidth may correspond to the system bandwidth, and the second bandwidth and the third bandwidth may be the same as or different from in size.

The first bandwidth to the third bandwidth may mean a bandwidth for receiving a downlink control channel of the corresponding terminal, but the present disclosure is not necessarily limited thereto.

In addition, the first bandwidth, the second bandwidth, and the third bandwidth each may mean capabilities or categories of different terminals. For example, in the present disclosure, first capability may be referred to as capability capable of supporting a bandwidth of X MHz, second capability may be referred to as capability capable of supporting a bandwidth of Y MHz, and third capability may be referred to as capability of supporting a bandwidth of Z MHz. At this time, the X, Y, and Z may be smaller than or equal to the bandwidth W MHz supported by the system.

Figure 1B:
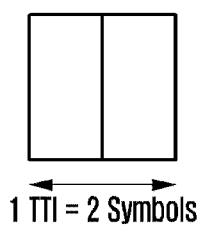
Figure 1C:
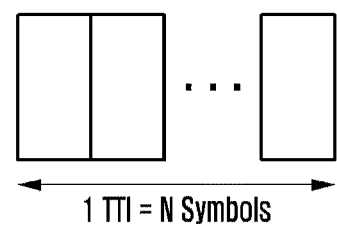

FIGS. 1A to 1C illustrate an example of a definition of a TTI according to an embodiment of the present disclosure.

FIG. 1A illustrates an example in which 1 TTI consists of 1 orthogonal frequency division multiplexing (OFDM) symbol or 1 single carrier-frequency division multiplexing (SC-FDM) symbol.

FIG. 1B illustrates an example in which 1 TTI consists of 2 OFDM symbols or 2 SC-FDM symbols.

FIG. 1C illustrates an example in which 1 TTI consists of 3 or more OFDM symbols or SC-FDM symbols (e.g., 1 TTI may be defined as 1 slot consisting of 7 symbols, or 1 slot consisting of 14 symbols may be defined as 1 TTI).

In this case, in FIGS. 1A to 1C, a bandwidth may be a system bandwidth or a UE bandwidth. The system bandwidth may mean a maximum bandwidth per carrier that a system may support, and the UE bandwidth may mean a maximum bandwidth per carrier that a terminal may support. For example, assuming that a maximum bandwidth that the 5G system may support is 100 MHz per carrier, a maximum bandwidth per carrier that the mMTC terminal may support is 1.4 MHz, which may be different from the system bandwidth. In addition, a maximum bandwidth per carrier that the eMBB system may support may be 400 MHz (system bandwidth=400 MHz), and a UE-A may support 400 MHz (UE-A's bandwidth=400 MHz) but another UE-B may support only 40 MHz (UE-B's bandwidth=40 MHz). On the other hand, in a specific system, the system bandwidth and the UE bandwidth may be the same in size.

FIGS. 2A to 2C illustrate an example of various TTIs for each service, according to an embodiment of the present disclosure.

As illustrated in FIG. 2A, since the URLL service needs to satisfy short latency requirement, a TTI having a shorter length than the eMBB service of FIG. 2B may be used. Here, the use of a TTI having a short length may mean that control information and data are transmitted in a shorter time than in the case of using a TTI having a long length and feedback information for data transmission and reception is also transmitted in a shorter time.

Meanwhile, as illustrated in FIG. 2C, since the mMTC service needs to satisfy wide coverage latency requirement, a TTI having a longer length than the eMBB service of FIG. 2B may be used.

The eMBB, URLL, and mMTC services may use the same subcarrier spacing or different subcarrier spacings. As an example of using the same subcarrier spacing, the subcarrier spacing of 15 kHz may be used for all the eMBB, URLL, and mMTC services. However, in order to support TTIs depending on different requirements, different TTI consisting of different number of symbols may be operated.

That is, 1 TTI of the eMBB consists of 14 symbols, and 1 TTI of the URLL may be consisting of a smaller number of symbols (e.g., 7 symbols) than 14, and the TTI of the mMTC has a larger number of TTIs (e.g., 28 symbols) than 14.

On the other hand, as an example in which the eMBB, URLL, and mMTC services use different subcarrier spacings, the eMBB may use 30 kHz as the subcarrier spacing, the URLL may use 60 kHz as the subcarrier spacing, and the mMTC may use 15 kHz as the subcarrier spacing.

In the OFDM system, if the subcarrier spacing of the frequency base is increased, the symbol length of the time base is reduced. Accordingly, the eMBB, URLL, and mMTC services maintain the same number of OFDM (or SC-FDM) symbols within 1 TTI, but may take different TTI lengths by changing the subcarrier spacing.

For example, the TTI of the mMTC (15 kHz) having the smallest subcarrier spacing becomes the longest (e.g., 1 ms), the TTI of the eMBB (30 kHz) having the second smallest subcarrier spacing next becomes 0.5 ms, and the TTI of the URLL (60 kHz) having the largest subcarrier spacing becomes the shortest as 0.25 ms. The eMBB, the URLL, and the mMTC may have the same bandwidth or different bandwidths in size. For example, assuming 15 kHz subcarrier spacing, the size of 1 RB is 180 kHz on the frequency base (15 kHz×12 subcarriers per RB). Therefore, if the subcarrier spacing is increased to 30 kHz, a size of 1 RB may be 360 kHz, and if the subcarrier spacing is increased to 60 kHz, a size of 1 RB may be 720 kHz. Therefore, the length of 1 TTI on the time base and the size of 1 RB on the frequency base may be changed depending on the subcarrier spacing.

Figure 3A:
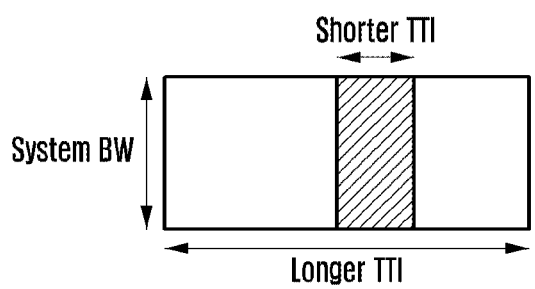
FIGS. 3A and 3B illustrate an example of a case where TTIs having different lengths coexist in one system according to an embodiment of the present disclosure.
Figure 3B:
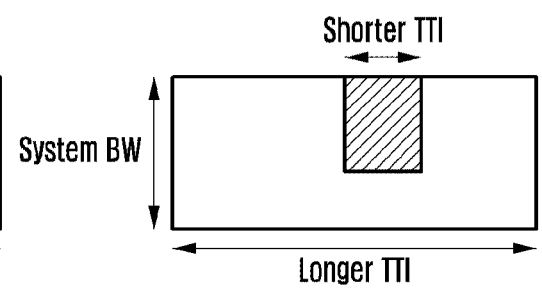

FIGS. 3A and 3B illustrate an example of a case where TTIs having different lengths coexist in one system according to an embodiment of the present disclosure.

More specifically, FIG. 3 illustrates an example that uses the same subcarrier spacing to support TTIs having different lengths. For example, when a longer TTI consists of N OFDM (or SC-FDM) symbols, a shorter TTI consists of M OFDM (or SC-FDM) symbols, where N>M.

Meanwhile, as illustrated in FIG. 3A, the bandwidth of the longer TTI and the shorter TTI may be the same, and as illustrated in FIG. 3B, the bandwidth of the longer TTI and the bandwidth of the shorter TTI may be different from each other. In this case, FIG. 3B illustrates the case where the bandwidth of the longer TTI is larger than that of the shorter TTI, but the opposite case may exist (that is, the case where the bandwidth of the shorter TTI is larger than that of the longer TTI).

FIGS. 4A to 4D illustrate another example of the case where the TTIs having the different lengths coexist in one system according to the embodiment of the present disclosure.

More specifically, an example of using subcarrier spacing having different sizes to support TTIs having different lengths is illustrated. For example, if the longer TTI is configured using subcarrier spacing S1, the shorter TTI is configured using subcarrier spacing S2, where S1<S2.

As illustrated in FIGS. 4A and 4B, it may be assumed that both the shorter TTI and the longer TTI use the same bandwidth (the resource sizes occupied by the shorter TTI and the longer TTI on the frequency base are the same). In this case, a gap on the time base may be required to align symbol boundaries of the shorter TTI and the longer TTI.

In this case, the gap may be located at the beginning of the shorter TTI or at the end of the shorter TTI. The purpose of the Gap is to solve inter symbol interference (ISI) that may occur by using different subcarrier spacings between the shorter TTI and the longer TTI. The Gap may be included within the shorter TTI unlike the example of FIGS. 4A and 4B. That is, assuming that the shorter TTI consists of M symbols, the last M-th symbol may be used as the gap.

Meanwhile, as illustrated in FIGS. 4C and 4D, it may be assumed that the shorter TTI and the longer TTI use different bandwidths (the resource sizes occupied by the shorter TTI and the longer TTI on the frequency base are different). In particular, the case where the system bandwidth supporting the longer TTI and the reception bandwidth of the terminal supporting the shorter TTI service are different from each other is illustrated.

In this case, as illustrated in FIG. 4C, a guard carrier, a guard resource block (Guard RB), a guard band or the like on the frequency base are required. The purpose of the guard is to solve inter carrier interference (ISI) that may occur by using different subcarrier spacings between the shorter TTI and the longer TTI.

As illustrated in FIG. 4D, both of the gap on the time base and the guard on the frequency base may be required. The gap on the time base of FIG. 4D may be located at the end of the shorter TTI as illustrated in FIG. 4B.

Meanwhile, FIGS. 4C and 4D illustrate the case where the bandwidth of the longer TTI is larger than the bandwidth of the shorter TTI, but the opposite case may exist (that is, the case where the bandwidth of the shorter TTI is larger than that the longer TTI).

Figures 5A, 5B:
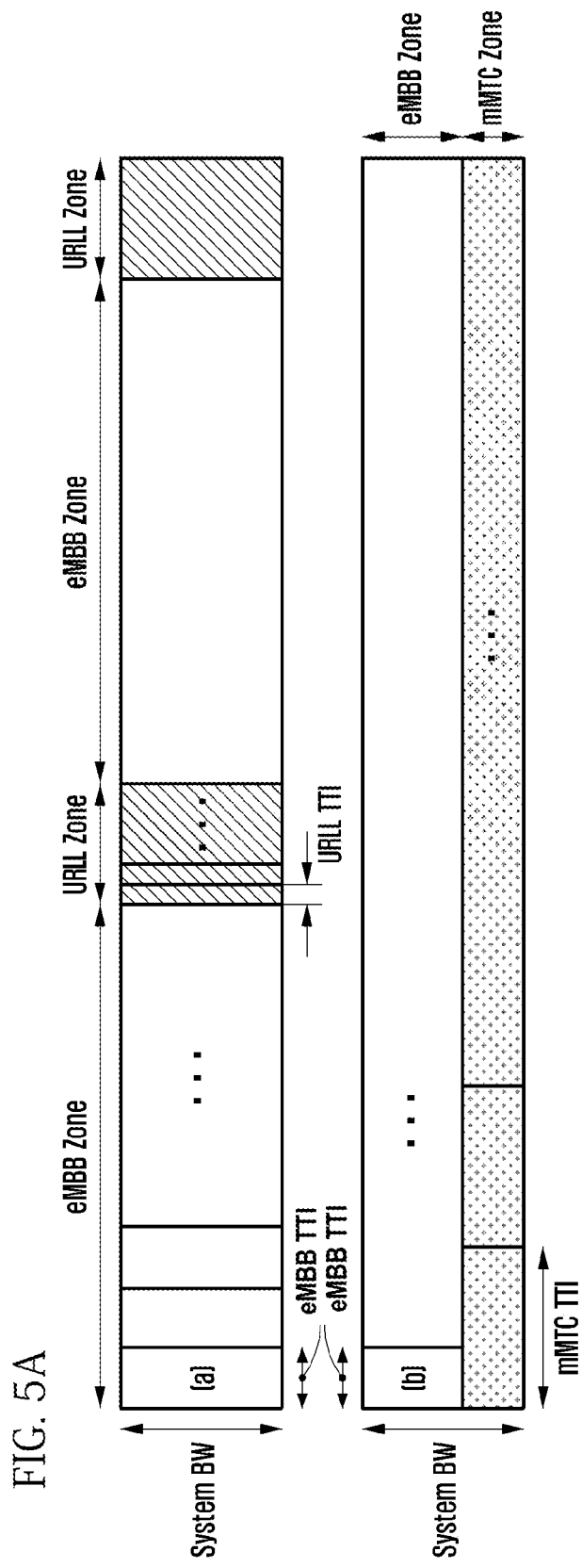
FIGS. 5A and 5B illustrate an example of static resource allocation in a wireless communication system.

FIGS. 5A and 5B illustrate an example of static resource allocation in a wireless communication system.

In order to support different services such as the eMBB, the URLL, and the mMTC, a base station may semi-statically allocate time-frequency resources corresponding to each service to a terminal. Time-frequency resource allocation through a system information block (SIB) or UE-specific RRC signaling may be an example of a representative static resource allocation.

Particularly, FIG. 5A illustrates an example in which the base station semi-statically allocates an eMBB zone and a URLL zone. At this point, the zone consists of a plurality of TTIs.

As illustrated in FIG. 5A, if resources are semi-statically allocated on the time base, latency problem may occur. For example, in a service where the short latency such as the URLL is the critical requirement, the URLL service is not supported until the URLL zone is configured or before the URLL zone arrives (e.g., if the current time corresponds to the eMBB zone).

Meanwhile, as illustrated in FIG. 5B, if resources are semi-statically allocated on the time base, a waste of resources may occur. For example, if the mMTC terminal does not exist in a zone served by the base station, or if the minimum number of mMTC terminals exist, most frequency resources may not be used because a frequency for providing the mMTC service has been allocated in advance.

In addition, FIG. 5A illustrates an example in which the system bandwidth is equal to that of each service, and FIG. 5B illustrates an example in which the system bandwidth and the reception bandwidth of the terminal supporting specific services (e.g., mMTC service) are different from each other.

Figure 6A:
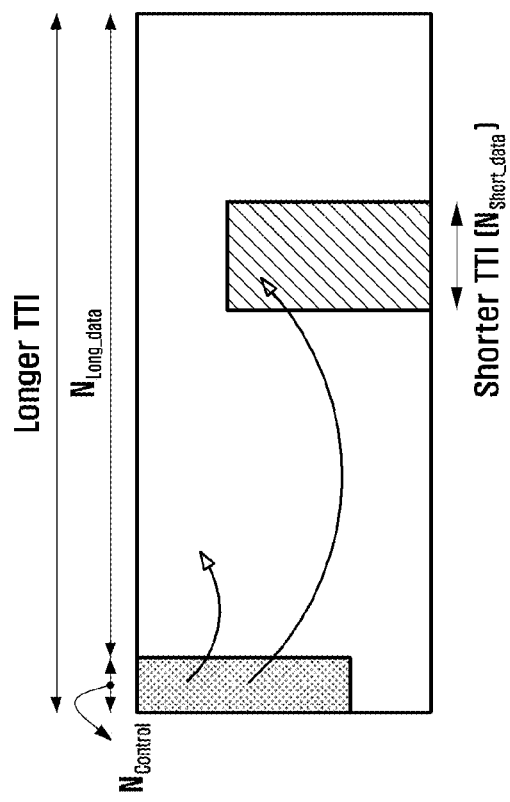
FIGS. 6A and 6B illustrate an example of a transmission of downlink control information of a base station according to an embodiment of the present disclosure.
Figure 6B:
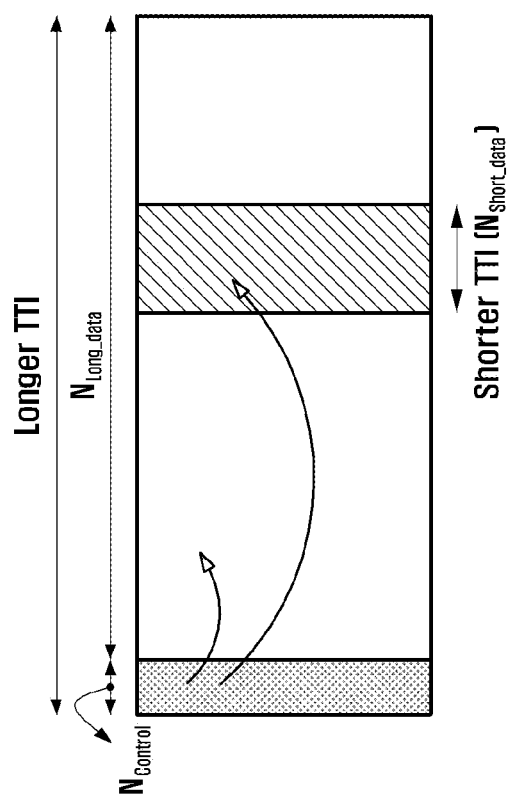

FIGS. 6A and 6B illustrate an example of a transmission of downlink control information of a base station according to an embodiment of the present disclosure.

If the shorter TTI coexists with the longer TTI, as illustrated in FIG. 6, the downlink control information for the service using the shorter TTI and the downlink control information for the service using the longer TTI may be transmitted from the same location. For example, assume that the longer TTI consists of $N_{Control}$ ($N_{Control} \geq 1$) symbols and $N_{Long\_data}$ symbols and the shorter TTI consists of $N_{Short\_data}$ symbols. At this time, $N_{Long\_data} > N_{Short\_data}$. The $N_{Control}$ symbols may be used to transmit the downlink control information based on a starting point of the long TTI. At this point, the downlink control information may include the time-frequency resource allocation information of the terminal A using the longer TTI and the time-frequency resource allocation information of the terminal B using the shorter TTI.

In addition, the downlink control information may include both the time-frequency resource allocation information of the terminal C using the longer TTI and the time-frequency resource allocation information of the terminal C using the shorter TTI The downlink control information transmitted in the longer TTI may be transmitted by occupying the entire bandwidth as illustrated in FIG. 6A. In addition, FIG. 6A illustrates the case where the system bandwidth is equal to the bandwidth of each service supported by the terminal.

On the other hand, as illustrated in FIG. 6B, the downlink control information transmitted in the longer TTI does not occupy the entire bandwidth but may be transmitted by occupying some bandwidth. In addition, FIG. 6B illustrates the case where the system bandwidth and the reception bandwidth of the terminal supporting the specific service are different from each other.

Figure 7A:
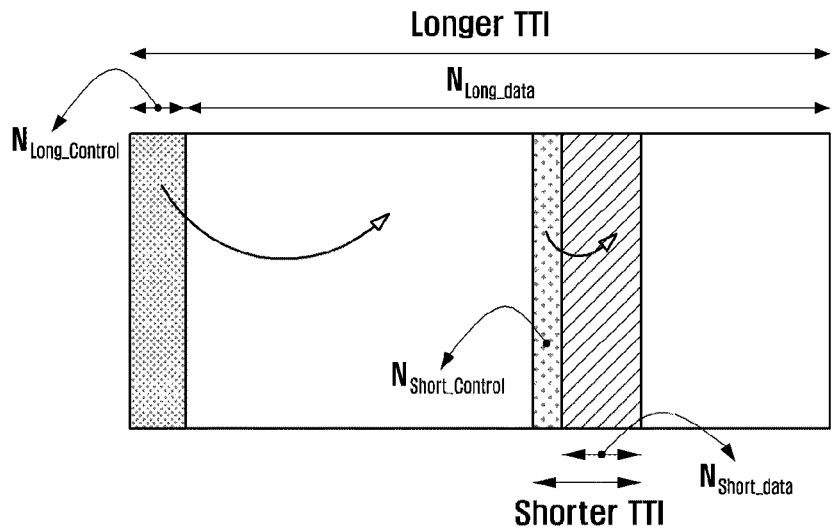
FIGS. 7A and 7B illustrate another example of the transmission of the downlink control information of the base station according to an embodiment of the present disclosure.
Figure 7B:
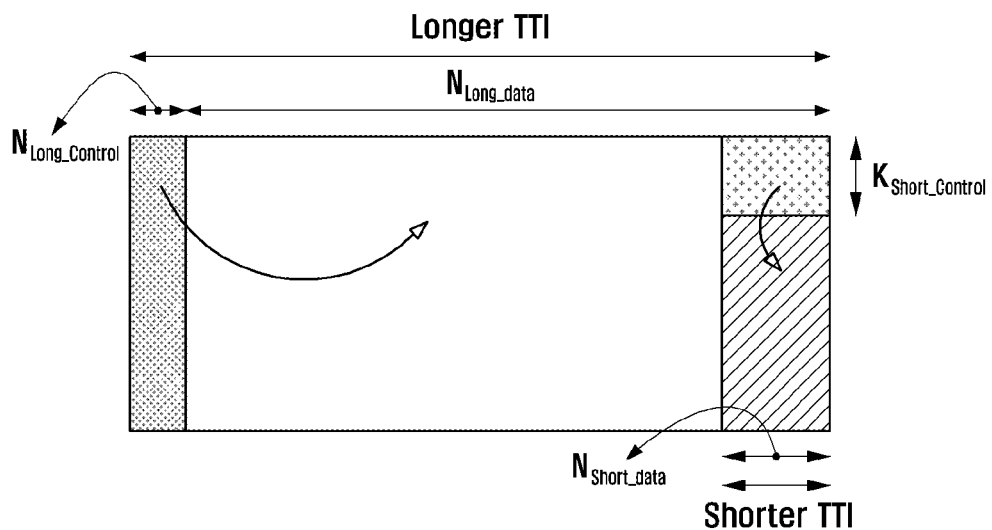

Meanwhile, FIG. 6 illustrates the case where the downlink control information for the shorter TTI and the longer TTI are transmitted in a zone consisting of $N_{Control}$ symbols, in which in the zone consisting of the $N_{Control}$ symbols, the downlink control information for the shorter TTI and the longer TTI may be transmitted using different time-frequency domains FIGS. 7A and 7B illustrate another example of the transmission of the downlink control information of the base station according to an embodiment of the present disclosure.

Unlike FIG. 6, FIG. 7 illustrates the case where the downlink control information for the shorter TTI is transmitted on the separate control channel for the shorter TTI. As illustrated in FIG. 7A, the separate downlink control information for the shorter TTI may be transmitted by time division multiplexing (TDM) with data of a shorter TTI in a zone consisting of $N_{Short\_control}$ symbols at a starting point of a shorter TTI. Alternatively, as illustrated in FIG. 7B, the separate downlink control information for the shorter TTI may be transmitted by frequency division multiplexing (FDM) with data of a shorter TTI in a zone consisting of $K_{Short\_control}$ subcarriers.

On the other hand, the downlink control information for the terminal using the longer TTI is transmitted at a starting point of a longer TTI as illustrated in FIG. 6. FIG. 7A illustrates an example in which the longer TTI and the shorter TTI use the same bandwidth. In this case, the bandwidth used for the transmission of the longer TTI and the shorter TTI may be the system bandwidth or the reception bandwidth of the terminal smaller than the system bandwidth. However, FIG. 7B illustrates an example in which a control channel region for the transmission of the longer TTI and a control channel region for the transmission of the shorter TTI use different bandwidths. Meanwhile, although not illustrated in FIGS. 7A and 7B, the longer TTI and the shorter TTI may use different bandwidths. For example, the shorter TTI may use the system bandwidth and the longer TTI may use the reception bandwidth of the terminal smaller than the system bandwidth. As another example, the longer TTI may use the system bandwidth and the shorter TTI may use the reception bandwidth of the terminal smaller than the system bandwidth. As another example, the longer TTI and the shorter TTI use different bandwidths. At this point, all the bandwidths may be the reception bandwidth of the terminal smaller than the system bandwidth.

Figure 8:
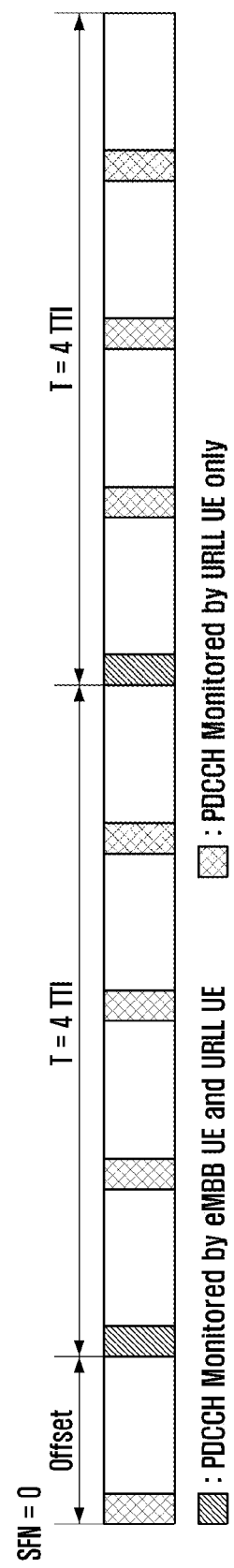
FIG. 8 illustrates an example of a reception interval of downlink control information of a terminal according to an embodiment of the present disclosure.

FIG. 8 illustrates an example of a reception interval of downlink control information of a terminal according to an embodiment of the present disclosure.

It may be considered that services using different TTIs coexist in one system and these services receive the downlink control information transmitted at different locations.

At this time, a base station notifies a reception interval of the downlink control information to be received by a terminal, such that power consumption of the terminal may be reduced.

For example, if two services of the eMBB and the URLL use different TTIs, the URLL needs to receive a physical downlink control channel (PDCCH) every TTI based on the short TTI in order to satisfy the requirement for the short latency. In contrast, the eMBB needs to receive every TTI based on a relatively longer TTI than the URLL.

FIG. 8 illustrates an example of a case where 4 TTIs of the URLL are 1 TTI of the eMBB based on 1 TTI of the URLL. The terminal supporting the eMBB service may receive the terminal's own PDCCH in 4 TTI units of the URLL, and the terminal supporting the URLL service may receive the terminal's own PDCCH in 1 TTI unit of the URLL.

In FIG. 8, the TTI (longer TTI) of the eMBB may be expressed based on TTI (shortest TTI) of the URLL. Therefore, interval information that needs to receive the PDCCH does not have to be transmitted to URLL terminals, and the interval information that needs to receive the PDCCH is transmitted to eMBB terminals. For convenience of explanation, the information may be named a PDCCH monitoring interval (or control channel monitoring information or PDCCH monitoring information, which is interchangeably used with each other below). The control channel monitoring information enables the base station to notify offset information (or first information) based on a specific subframe (e.g., system frame number (SFN) 0) and information (or may be referred to as interval information or second information) on whether TTI corresponding to several times the length of the shortest TTI corresponds to the actual eMBB TTI (4 TTIs in FIG. 8). Here, the SFN 0 may be referred to as a reference frame or a reference subframe.

In FIG. 8, there is an example of two cases of the URLL and the eMBB, but the present disclosure is not limited thereto. For example, the base station may notify even the mMTC of an offset based on the shortest TTI and information (i.e., interval information or second information) on TTI of x times.

The offset information and the information on whether the TTI corresponding to several times the length of the shortest TTI that are notified by the base station is the actual PDCCH reception interval may be transmitted to the terminal through a master information block (MIB), the system information block (SIB), or the UE-specific RRC signaling.

If the transmission is made using cell-specific information like the MIB and the SIB, all terminals within a cell use the same PDCCH monitoring interval, but if the UE-specific RRC signaling is used, each terminal may use different PDCCH monitoring intervals.

FIG. 8 illustrates an example in which the longer TTI and the shorter TTI use the same bandwidth. In this case, the bandwidth used for the transmission of the longer TTI and the shorter TTI may be the system bandwidth or the reception bandwidth of the terminal smaller than the system bandwidth.

Meanwhile, although not illustrated in FIG. 8, according to another embodiment of the present disclosure, the longer TTI and the shorter TTI may use different bandwidths. For example, the shorter TTI may use the system bandwidth and the longer TTI may use the reception bandwidth of the terminal smaller than the system bandwidth. As another example, the longer TTI may use the system bandwidth and the shorter TTI may use the reception bandwidth of the terminal smaller than the system bandwidth. As another example, the longer TTI and the shorter TTI use different bandwidths. At this point, all the bandwidths may be the reception bandwidth of the terminal smaller than the system bandwidth. If the bandwidth used by the base station for the transmission of the longer TTI and the shorter TTI is different from the system bandwidth, the base station may transmit the PDCCH monitoring interval information including the information on the reception bandwidth. This will be exemplified and described in detail as follows. According to the embodiment of the present disclosure, in FIG. 8, since the PDCCH monitoring interval information is transmitted to the terminal using the longer TTI, the PDCCH monitoring interval may further include bandwidth related information (e.g., at least one of reception bandwidth information or frequency resource location information). The assumption is that the terminal using the longer TTI may use a second bandwidth (i.e., bandwidth smaller than the size of the system bandwidth) as a bandwidth.

Meanwhile, in the example of FIG. 8, the case where the eMBB service uses the longer TTI and the URLLC service uses a shorter TTI has been described, but different PDCCH monitoring intervals may be operated in the same service.

For example, the eMBB service may require wide bandwidth to support a high data rate (e.g., a system bandwidth of 400 MHz per component carrier). However, the terminal may support bandwidths smaller than the system bandwidth like a bandwidth of 40 MHz or a bandwidth of 100 MHz per component carrier depending on the terminal's own capability or category. In this case, the base station may configuration the PDCCH monitoring interval based on the capability that the terminal may support. More specifically, if the bandwidth that may be supported by the terminal is large, the PDCCH monitoring interval may be long on the time base in order to reduce the power consumption of the terminal (at this point, the bandwidth for monitoring the PDCCH is large on the frequency base). If the bandwidth that the terminal may support is small, the PDCCH monitoring interval may be short on the time base (at this point, the bandwidth for monitoring the PDCCH is short on the frequency base).

In another example, although different terminals (e.g., UE-A and UE-B supporting 100 MHz as the bandwidth of the terminal) have the same UE bandwidth, the base station may configure different PDCCH monitoring intervals depending on a battery remaining quantity of the terminal. That is, when the battery remaining quantity of the UE-A is small, the base station may be configured so that the UE-A may operate less time base resource and frequency base resource for the PDCCH monitoring. In addition, when the battery remaining quantity of the UE-B is large, the base station may be configured so that the UE-A may operate more time base resource and frequency base resource for the PDCCH monitoring.

Figure 9:
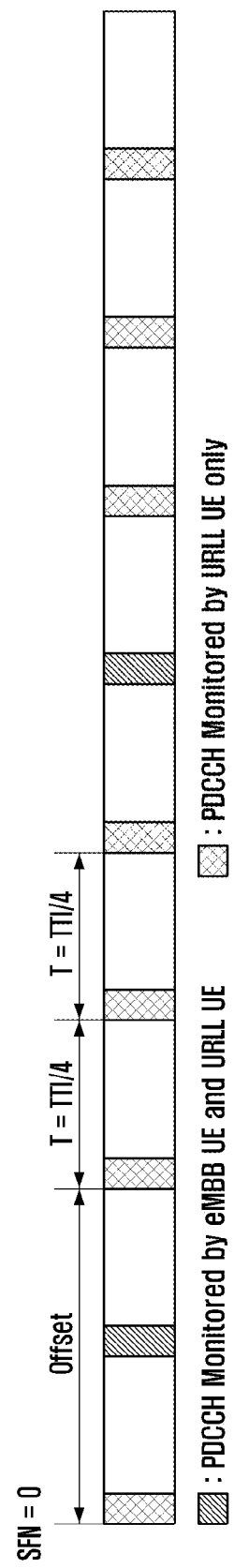
FIG. 9 illustrates another example of the reception interval of the downlink control information of the terminal according to the embodiment of the present disclosure.

FIG. 9 illustrates another example of the reception interval of the downlink control information of the terminal according to the embodiment of the present disclosure.

The difference between FIG. 8 and FIG. 9 is that the TTI (shorter TTI) of URLL is expressed based on the TTI (longest TTI) of the eMBB. Therefore, there is no need to transmit the PDCCH monitoring interval information to the eMBB terminals, and the PDCCH monitoring interval information (or control channel monitoring information) is transmitted to the URLL terminals. The information may enable the base station to notify offset information (or third information) based on a specific subframe (e.g., system frame number (SFN) 0) and information (or may be referred to as interval information or fourth information) on whether TTI corresponding to a fraction of the length of the longest TTI corresponds to the actual eMBB TTI (¼ TTIs in FIG. 8). Here, the SFN 0 may be referred to as a reference frame or a reference subframe.

Meanwhile, as illustrated in FIG. 8, even in FIG. 9, the longer TTI and the shorter TTI may use different bandwidths. In this case, the base station may transmit the information on the reception bandwidth of the longer TTI or the shorter TTI included in the PDCCH monitoring interval information.

This will be exemplified and described in detail as follows. According to the embodiment of the present disclosure, in FIG. 9, since the PDCCH monitoring interval information is transmitted to the terminal using the shorter TTI, the PDCCH monitoring interval may further include bandwidth related information (e.g., at least one of reception bandwidth information or frequency resource location information). The assumption is that the terminal using the longer TTI will use a second bandwidth (i.e., bandwidth smaller than the size of the system bandwidth) as a bandwidth.

Meanwhile, in the example of FIG. 9, the case where the eMBB service uses the longer TTI and the URLLC service uses a shorter TTI has been described, but different PDCCH monitoring intervals may be operated in the same service. For example, the eMBB service may require wide bandwidth to support a high data rate (e.g., a system bandwidth of 400 MHz per component carrier). However, the terminal may support bandwidths smaller than the system bandwidth like a bandwidth of 40 MHz or a bandwidth of 100 MHz per component carrier depending on the terminal's own capability or category. In this case, the base station may configuration the PDCCH monitoring interval based on the capability that the terminal may support. More specifically, if the bandwidth that may be supported by the terminal is large, the PDCCH monitoring interval may be long on the time base in order to reduce the power consumption of the terminal (at this point, the bandwidth for monitoring the PDCCH is large on the frequency base). If the bandwidth that the terminal may support is small, the PDCCH monitoring interval may be short on the time base (at this point, the bandwidth for monitoring the PDCCH is short on the frequency base).

In another example, although different terminals (e.g., UE-A and UE-B supporting 100 MHz as the bandwidth of the terminal) have the same UE bandwidth, the base station may configure different PDCCH monitoring intervals depending on a battery remaining quantity of the terminal. That is, when the battery remaining quantity of the UE-A is small, the base station may be configured so that the UE-A may operate less time base resource and frequency base resource for the PDCCH monitoring. In addition, when the battery remaining quantity of the UE-B is large, the base station may be configured so that the UE-A may operate more time base resource and frequency base resource for the PDCCH monitoring.

Figure 10:
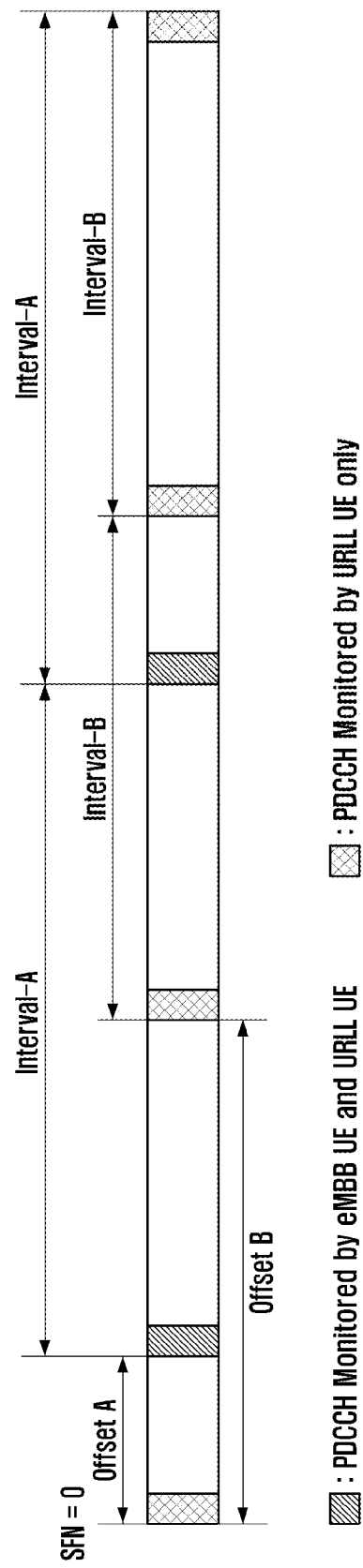
FIG. 10 illustrates yet another example of the reception interval of the downlink control information of the terminal according to the embodiment of the present disclosure.

FIG. 10 illustrates yet another example of the reception interval of the downlink control information of the terminal according to the embodiment of the present disclosure.

In FIGS. 8 and 9, the longer TTI is configured as an integer multiple of the shorter TTI, but FIG. 10 is an example of the otherwise case.

That is, services using different TTIs have different PDCCH monitoring intervals (control channel monitoring intervals). For example, service A using TTI-A and service B using TTI-B have different offset-A and offset-B and different interval-A and interval-B. The base station may transmit information on the different offsets and intervals to the terminal through the MIB, the SIB, or the UE-specific RRC. If the transmission is made using the cell-specific information like the MIB and the SIB, all the terminals within the cell may use the same PDCCH monitoring interval. Meanwhile, if the UE-specific RRC signaling is used, each terminal may use different PDCCH monitoring intervals.

Meanwhile, as illustrated in FIGS. 8 and 9, even in FIG. 9, the longer TTI and the shorter TTI may use different bandwidths. In this case, the base station may transmit the information on the reception bandwidth of the longer TTI or the shorter TTI included in the PDCCH monitoring interval information.

Meanwhile, in the example of FIG. 10, the case where the eMBB service uses the longer TTI and the URLLC service uses a shorter TTI has been described, but different PDCCH monitoring intervals may be operated in the same service. For example, the eMBB service may require wide bandwidth to support a high data rate (e.g., a system bandwidth of 400 MHz per component carrier). However, the terminal may support bandwidths smaller than the system bandwidth like a bandwidth of 40 MHz or a bandwidth of 100 MHz per component carrier depending on the terminal's own capability or category. In this case, the base station may configuration the PDCCH monitoring interval based on the capability that the terminal may support. More specifically, if the bandwidth that may be supported by the terminal is large, the PDCCH monitoring interval may be long on the time base in order to reduce the power consumption of the terminal (at this point, the bandwidth for monitoring the PDCCH is large on the frequency base). If the bandwidth that the terminal may support is small, the PDCCH monitoring interval may be short on the time base (at this point, the bandwidth for monitoring the PDCCH is short on the frequency base).

In another example, although different terminals (e.g., UE-A and UE-B supporting 100 MHz as the bandwidth of the terminal) have the same UE bandwidth, the base station may configure different PDCCH monitoring intervals depending on a battery remaining quantity of the terminal. That is, when the battery remaining quantity of the UE-A is small, the base station may be configured so that the UE-A may operate less time base resource and frequency base resource for the PDCCH monitoring. In addition, when the battery remaining quantity of the UE-B is large, the base station may be configured so that the UE-A may operate more time base resource and frequency base resource for the PDCCH monitoring.

Figure 11:
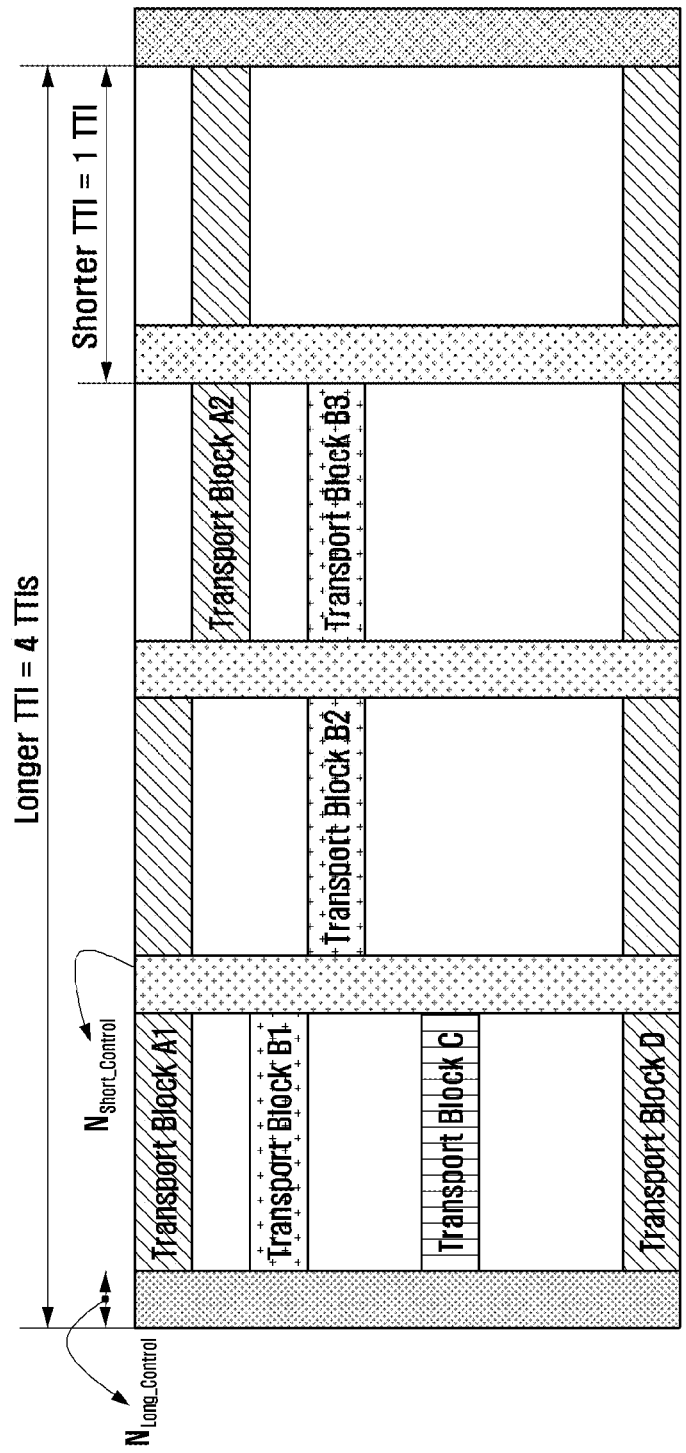
FIG. 11 illustrates an example of transmission of a transport block (TB) of a terminal having a longer TTI according to an embodiment of the present disclosure.

FIG. 11 illustrates an example of transmission of a transport block (TB) of a terminal having a longer TTI according to an embodiment of the present disclosure.

When the shorter TTI coexists within the longer TTI, the scheduler of the base station may configure various TBs for data requiring the longer TTI transmission.

For example, as illustrated in TB-D of FIG. 11, one TB may occupy the whole of the longer TTI or one TB may occupy a portion of the longer TTI as in TB-C.

Also, different TBs may be transmitted to one terminal within the longer TTI. For example, TB-A1 and TB-A2 may be transmitted to terminal A, and TB-B1, TB-B2 and TB-B3 may be transmitted to terminal B.

If a plurality of TBs is transmitted to one terminal, the base station may notify the downlink control information (DCI) of the time-frequency resource information of each TB. In addition, if the plurality of TBs is transmitted to one terminal, each TB may be transmitted through a predetermined time pattern or frequency pattern or time-frequency pattern. Meanwhile, the plurality of TBs may be transmitted to a plurality of terminals in the longer TTI. For example, the TB-B1 may be transmitted to the terminal A, the TB-B2 may be transmitted to the terminal B, and the TB-B3 may be transmitted to the terminal C.

In order to support the operation illustrated in FIG. 11, the PDCCH (or control information) may further include not only the frequency base resource information of the TB but also a field notifying the time base resource information of the TB.

For example, in the case of transport block D, the base station may notify whether a TB-D location on the frequency base is located at a bottom (the case where the frequency index starts from the top refers to a last frequency index or the case where the frequency index starts from the bottom refers to a first frequency index), how many resource blocks (RBs) are occupied (1 RB illustrated in FIG. 11), and a length of the TB-D on the time base (in FIG. 11, the TB-D occupy the entire TTI).

In this case, resources allocated for the longer TTI and resources allocated for the shorter TTI may overlap with each other. For example, the transport block D for the longer TTI may overlap with the transport block that is transmitted to a control channel (control channel consisting of $N_{Short\_control}$ in FIG. 11) for the shorter TTI and although not explicitly illustrated in FIG. 11, the data channel for the shorter TTI. In order to solve the above problem, the base station may include information on a time or frequency domain in which the control information channel or the data channel of the shorter TTI is allocated to the DCI transmitted to the terminal receiving data for the longer TTI. The longer TTI use terminal receiving the same may puncture and receive a zone notified from the DCI.

On the other hand, in case of the TB-C, the base station may notify the terminal of the TB-C location on the frequency base and the TB-C length on the time base. At this point, the length of the TB on the time base may be indicated by the number of symbols (e.g., a start point and an end point of a symbol) or in the form of a bitmap (e.g., 001110000111: A symbol location indicating 1 among 12 symbols is a time location to which the TB is transmitted).

On the other hand, the PDCCH may indicate how many TBs are transmitted within 1 TTI. For example, in the case of the TB-A, two TBs (TB-A1 and TB-A2) are transmitted to the UE-A within 1 TTI and in the case of the TB-B, three TBs (TB-B1, TB-B2, and TB-B3) are transmitted to the UE-B within 1 TT1.

For this purpose, there is a need for a field notifying that two TBs are transmitted to the PDCCH transmitted to the UE-A in 1 TTI and three TBs are transmitted to the PDCCH transmitted to the UE-B in 1 TTI. If two or more TBs are transmitted within 1 TTI, the resource allocation information for the frequency location and the time location of each TB is required. At this time, the time/frequency resource position of the first transmitted TB may determine the time/frequency resource location of the next transmitted TB. That is, the time/frequency location of the next transmitted TB may be determined by the pattern promised between the base station and the terminal based on the time/frequency resource location of the first TB.

In another embodiment, the time/frequency resources of each of the two or more transmitted TBs may be explicitly allocated to the PDCCH. For example, in case of the TB-A, the time/frequency resource locations of the TB-A1 and the time/frequency resource locations of the TB-A2 may be transmitted to UE-A through the PDCCH.

In yet another embodiment, the above-mentioned operations may not be UE-specific but may be service-specific. For example, the service-A supporting the longer TTI may use two TBs within one longer-TTI and the service-B supporting the shorter TTI may use one TB within one shorter-TTI.

In this case, it may be assumed that the UE-A supporting the service-A knows in advance that the TB allocated to the UE-A is two within the longer-TTI, and the UE-B supporting the service-B knows in advance that the TB allocated to the UE-B is one within the shorter-TTI.

Figure 12:
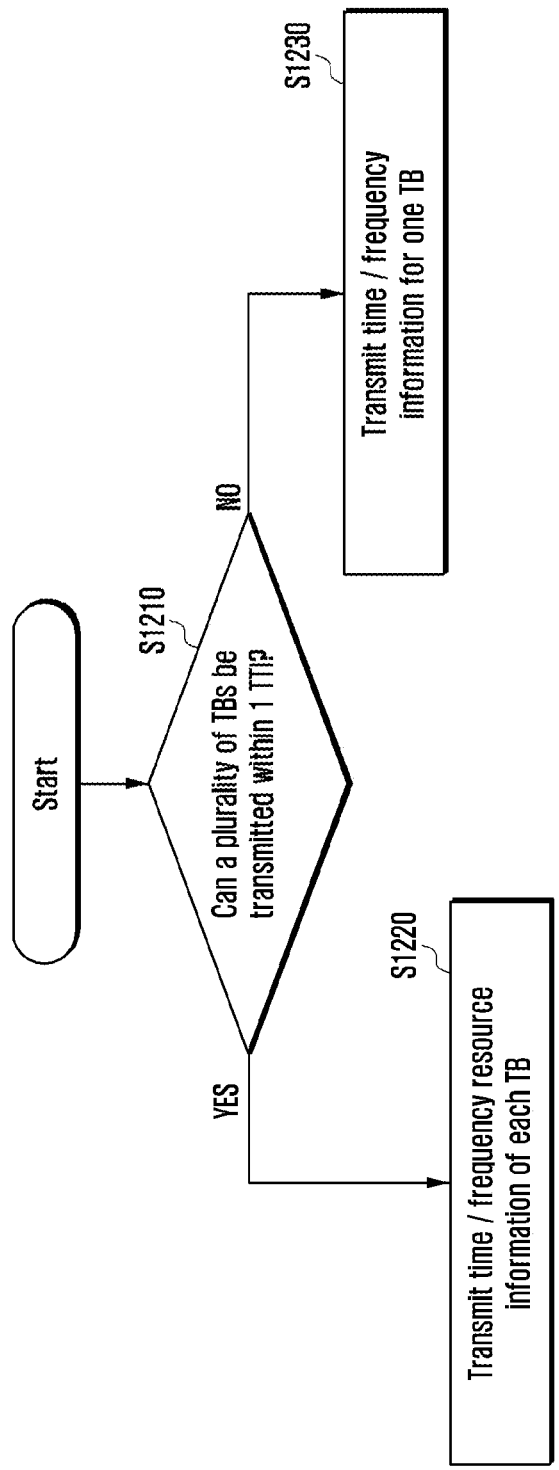
FIG. 12 illustrates a flow chart of an operation order of a base station for transmitting two or more transport blocks (TBs) within 1 TTI according to an embodiment of the present disclosure.

FIG. 12 illustrates a flow chart of an operation order of a base station for transmitting two or more transport blocks (TBs) within 1 TTI according to an embodiment of the present disclosure.

In step S1210, the base station determines whether two or more TB transmissions are required in 1 TTI. The determination may be based on the following grounds. Since a plurality of shorter TTIs are included within the longer TTI, the TB of the terminal that needs to receive data by the service corresponding to the longer TTI is transmitted over the longer TTI to perform a lot of puncturing, thereby causing the deterioration in the reception performance of the longer TTI. As a result, it may be determined that two or more TB transmissions are required within 1 TTI. As another ground, there may be a case where the TB size of the longer TTI is small but periodic traffic is expected (for example, VoIP service).

If it is determined that the base station transmits two or more transport blocks (TBs) within 1 TTI, in step S1220, the base station may transmit the time and frequency resources for each TB and the information on the frequency resources to the terminal through the UE-specific signaling (e.g., UE-specific RRC signaling or DCI signaling). A detailed embodiment of the signaling method is described in the description of FIG. 11 and therefore the content thereof will be omitted.

On the other hand, if the base station does not transmit two or more transport blocks (TBs) within 1 TTI, the base station proceeds to step S1230 to be able to transmit only one TB within 1 TTI. How many TBs may be transmitted within 1 TTI may be transmitted to the terminal through the UE-specific signaling (e.g., UE-specific RRC signaling or DCI signaling) or may be transmitted to the terminal through the cell-specific signaling. If the cell-specific signaling is used, how many TBs may be transmitted within 1 TTI may be service-specified. For example, the service A may transmit N TBs within 1 TTI, and the service B may transmit M TBs within one TTI, in which N and M may be equal or different.

Figure 13:
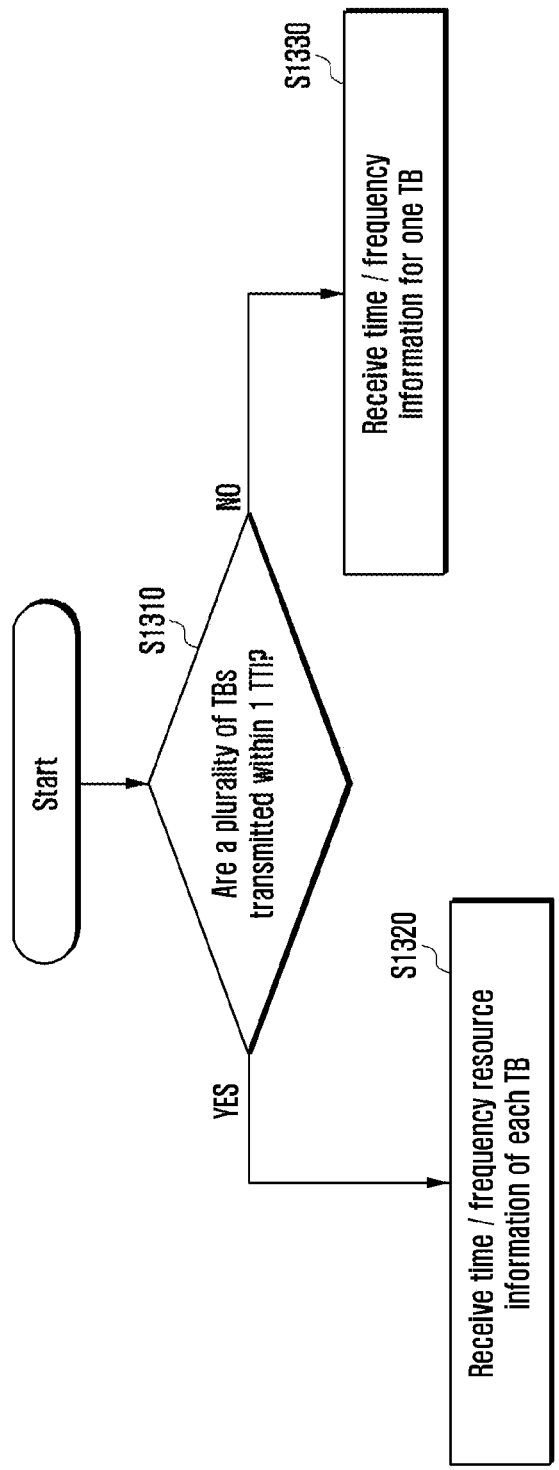
FIG. 13 illustrates a flow chart of an operation sequence of a terminal for transmitting two or more transport blocks (TBs) within 1 TTI according to an embodiment of the present disclosure.

FIG. 13 illustrates a flow chart of an operation sequence of a terminal for transmitting two or more transport blocks (TBs) within 1 TTI according to an embodiment of the present disclosure.

In step S1310, the base station determines whether two or more TB transmissions are performed in 1 TTI. The determination may be performed through the UE-specific signaling (e.g., UE-specific RRC signaling, or DCI signaling) or the cell-specific signaling that the base station transmits to the terminal. That is, the base station may be configured to have one of the information on how many TBs may be transmitted in 1 TTI through the signaling and the information on the time resource/frequency resource allocation to each TB.

If it is determined that the terminal transmits two or more transport blocks (TBs) within 1 TTI, in step S1320, the terminal may receive the time and frequency resources for each TB and the information on the frequency resources from the base station through the UE-specific signaling (e.g., UE-specific RRC signaling or DCI signaling).

On the other hand, if it is determined that the terminal does not transmit two or more transport blocks (TBs) within 1 TTI, the terminal proceeds to step S1330 to be able to receive only one TB within 1 TTI.

How many TBs may be transmitted within 1 TTI may be received from the base station through the UE-specific signaling (e.g., UE-specific RRC signaling or DCI signaling) or may be received from the base station through the cell-specific signaling.

If the cell-specific signaling is used, how many TBs may be transmitted within 1 TTI may be service-specified. For example, the service A may transmit N TBs within 1 TTI, and the service B may transmit M TBs within one TTI, in which N and M may be equal or different.

Figure 14:
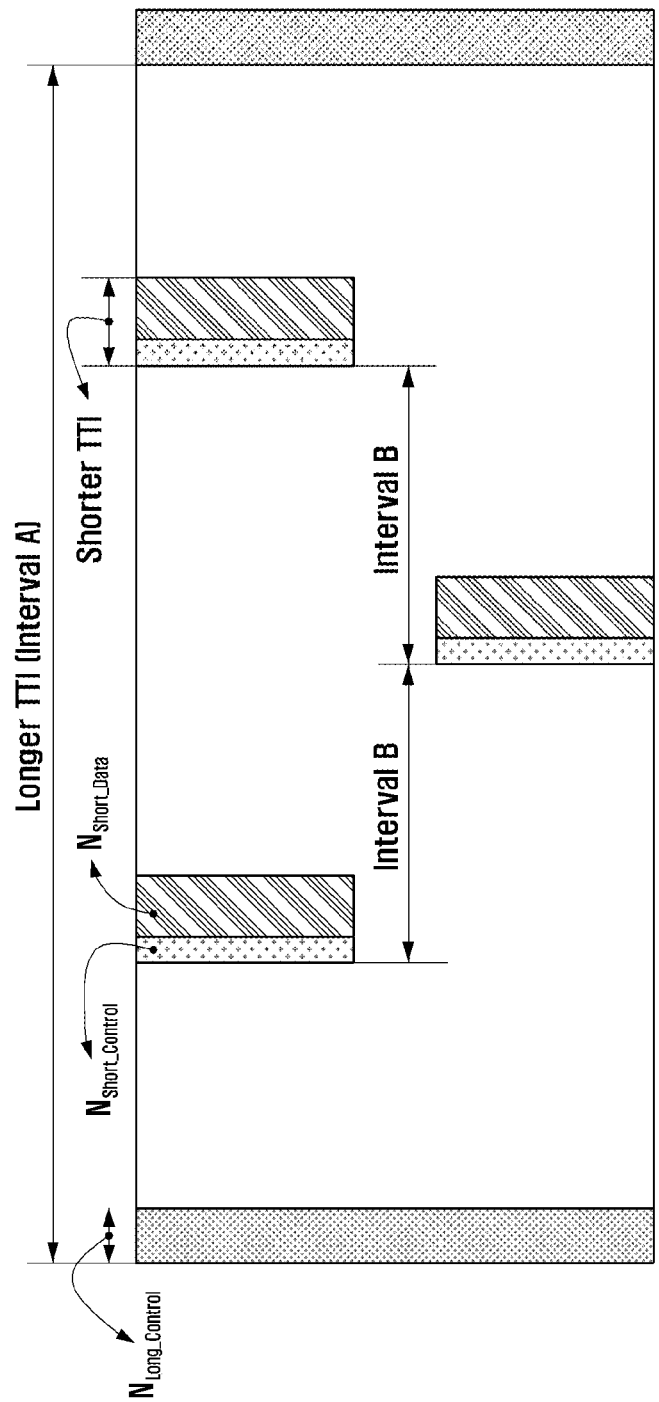
FIG. 14 illustrates an example of a downlink control channel transmission location of a terminal having a shorter TTI according to an embodiment of the present disclosure.

FIG. 14 illustrates an example of a downlink control channel transmission location of a terminal having a shorter TTI according to an embodiment of the present disclosure.

As illustrated in FIG. 11, if the downlink control channel location of the shorter TTI occupies the entire frequency base, the data transmission for the terminal using the longer TTI may be restricted.

For example, if the TB-D is transmitted to the terminal using the longer TTI in FIG. 11, the TB-D may overlap with the location of the resource used for the downlink control channel transmission of the shorter TTI. In this case, a base station scheduler may puncture the time-frequency resource to which the downlink control channel of the shorter TTI is transmitted and transmit the punctured time-frequency resource to the longer TTI terminal. Therefore, the reception performance of the TB-D received by the longer TTI terminal may deteriorate.

In order to solve the above problem, FIG. 14 illustrates an example in which the downlink control channel transmission location of the terminal having the shorter TTI does not occupy the entire frequency but uses a portion of the frequency. The base station scheduler may schedule the TB to be transmitted by occupying the entire longer TTI as illustrated in the TB-D of FIG. 11 so that the TB is transmitted without separate puncturing in the zone where the control channel of the shorter TTI is not transmitted as illustrated in FIG. 14.

Meanwhile, the transmission of the shorter TTI may be transmitted at different locations every TTI of the shorter TTI to obtain frequency diversity. The transmission location of the shorter TTI may use a previously promised pattern between the base station and the terminal.

FIG. 14 illustrates the embodiment in which the shorter TTI is located at an upper end portion of the system bandwidth at a first time point, a lower end portion of the system bandwidth at a second time point, and at an upper end portion of the system bandwidth at a third time point. However, it is not necessarily limited to the embodiment illustrated in FIG. 14. For example, the shorter TTI may be located at the upper end of the system bandwidth at the first and second time points, and the shorter TTI may be located at the lower end of the system bandwidth at the third and fourth time points.

In addition, FIG. 14 illustrates that the shorter TTI is allocated from the upper end or the lower end of the system bandwidth but may be allocated at a predetermined interval while having a frequency offset.

According to the embodiment of the present disclosure, the base station may transmit the information about on which of the patterns the short TTI is located within the system band to the terminal using the shorter TTI. For example, if the plurality of previously promised patterns is defined, the base station may notify the terminal of the information about on which of the patterns the shorter TTI is used.

In this case, the plurality of terminals using the shorter TTI may each use the shorter TTIs having different patterns. In this case, the base station may notify each terminal of the shorter TTI pattern information used by each terminal through the UE-specific RRC signaling.

Alternatively, the base station may indicate two or more shorter TTI pattern information used by each terminal through the UE-specific RRC signaling, and may notify each of the terminals of the shorter TTI pattern information that each terminal needs to actually use in the corresponding longer TTI through a channel (channel consisting of $N_{Long\_Control}$) to which the DCI for the longer TTI is transmitted.

Alternatively, if a short TTI having one previously promised pattern is used, the base station may not separately notify the terminal of the information on the shorter TTI.

Another embodiment of FIG. 14 is the case where the bandwidth of the longer TTI and the bandwidth of the shorter TTI may different from each other. That is, the PDCCH having the longer TTI is transmitted using the entire system bandwidth, but the PDCCH having the shorter TTI may be transmitted through a bandwidth smaller than the system bandwidth. The terminal supporting only the shorter TTI service may decode the PDCCH only in the corresponding bandwidth, and therefore an indication of the frequency location of the PDCCH is required. The frequency location of the PDCCH for the shorter TTI may use the previously promised pattern between the base station and the terminal as described above or notify the frequency resource information for the PDCCH transmission of the shorter TTI in the $N_{Long\_control}$ region. If the PDCCH frequency resource information of the shorter TTI is notified in the $N_{Long\_control}$ region, all the PDCCH frequency resource information of the shorter TTI transmitted within the longer TTI may be notified (i.e., in FIG. 14, there are three shorter TTI PDCCHs within the longer TTI, and therefore all the information on three PDCCH frequency resources is notified). However, the method may be preferable because of the increased signaling overhead. Therefore, it is possible to notify the information on the frequency resource of the first shorter TTI PDCCH transmission in the $N_{Long\_Control}$ region, and use the promised pattern for the frequency resource information for the subsequent PDCCH transmission. As another example, the PDCCH monitoring interval information transmitted from the base station to the terminal may include the information on the PDCCH frequency resource location.

On the other hand, the terminal supporting only the shorter TTI service may decode the PDCCH transmitted only in the terminal's own bandwidth. Therefore, in order to acquire the information on the frequency resource of the shorter TTI PDCCH transmission in the PDCCH region of the longer TTI transmitted through the system bandwidth, the information on the $N_{Short\_control}$ region transmitted in the $N_{Long\_Control}$ region needs to be transmitted in the corresponding bandwidth of the terminal supporting only the shorter TTI service. To this end, the information on the $N_{Short\_control}$ region needs to be transmitted in the promised $N_{Long\_Control}$ region between the base station and the terminal. The promise may be specified by the base station via the MIB.

Figure 15:
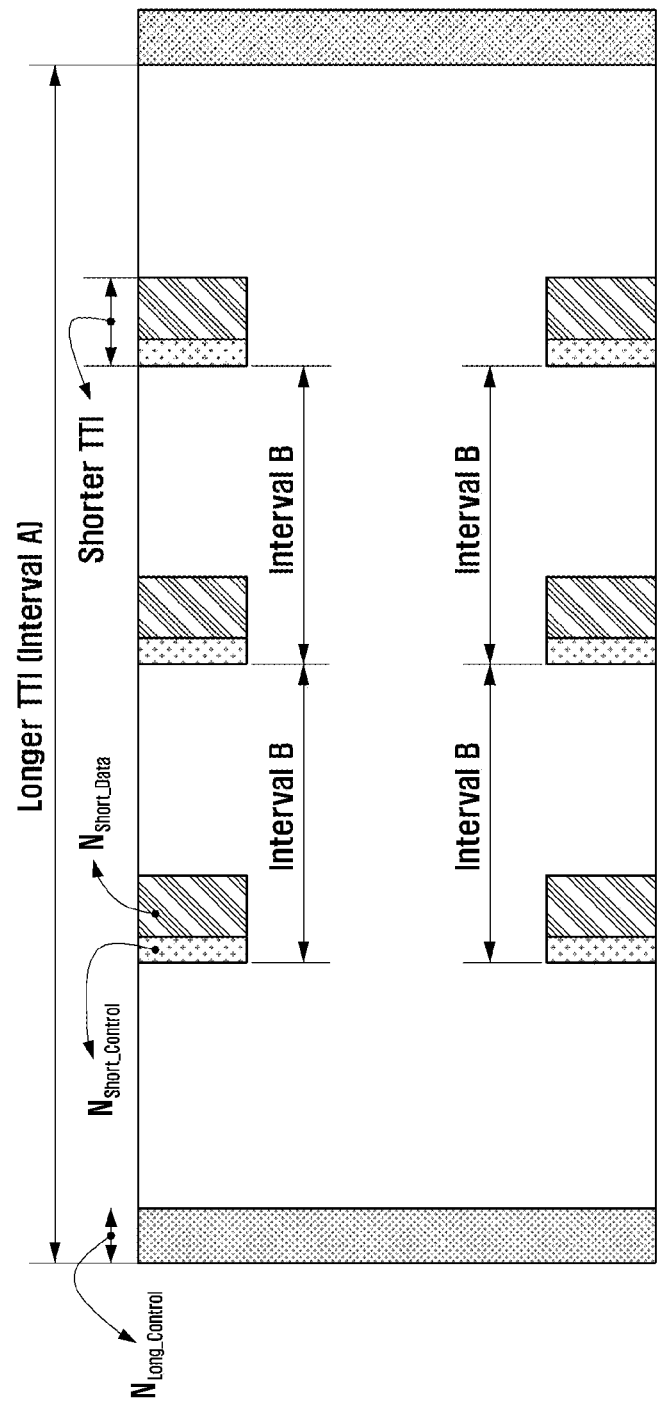
FIG. 15 illustrates another example of the downlink control channel transmission location of the terminal having the shorter TTI according to the embodiment of the present disclosure.

FIG. 15 illustrates yet another example of the downlink control channel transmission location of the terminal having the shorter TTI according to the embodiment of the present disclosure.

The difference from FIG. 14 is that the transmission of the downlink control channel and the data of the shorter TTI is located at both ends of the longer TTI. The downlink control channel and data transmission of the shorter TTI may be transmitted using time-frequency hopping as illustrated in FIG. 14, but in the case of the URLL service, multi-shot transmission may not be possible due to the requirement for very short latency. In this case, as illustrated in FIG. 15, the downlink control channel and data of the same information for the shorter TTI may be transmitted at the same time.

Another embodiment of FIG. 15 is the case where the bandwidth of the longer TTI and the bandwidth of the shorter TTI may different from each other. Therefore, as described in FIG. 14, the PDCCH frequency resource location of the shorter TTI may use the previously promised pattern between the base station and the terminal or notify the frequency resource information for the PDCCH transmission of the shorter TTI in the $N_{Long\_Control}$ region. If the PDCCH frequency resource information of the shorter TTI is notified in the $N_{Long\_Control}$ region, all the PDCCH frequency resource information of the shorter TTI transmitted within the longer TTI may be notified (i.e., in FIG. 15, there are three shorter TTI PDCCHs within the longer TTI, and therefore all the information on three PDCCH frequency resources is notified). However, the method may be undesirable because of the increased signaling overhead. Therefore, it is possible to notify the information on the frequency resource of the first shorter TTI PDCCH transmission in the $N_{Long\_Control}$ region, and use the promised pattern for the frequency resource information for the subsequent PDCCH transmission. As another example, the PDCCH monitoring interval information transmitted from the base station to the terminal may include the information on the PDCCH frequency resource location.

Figure 16:
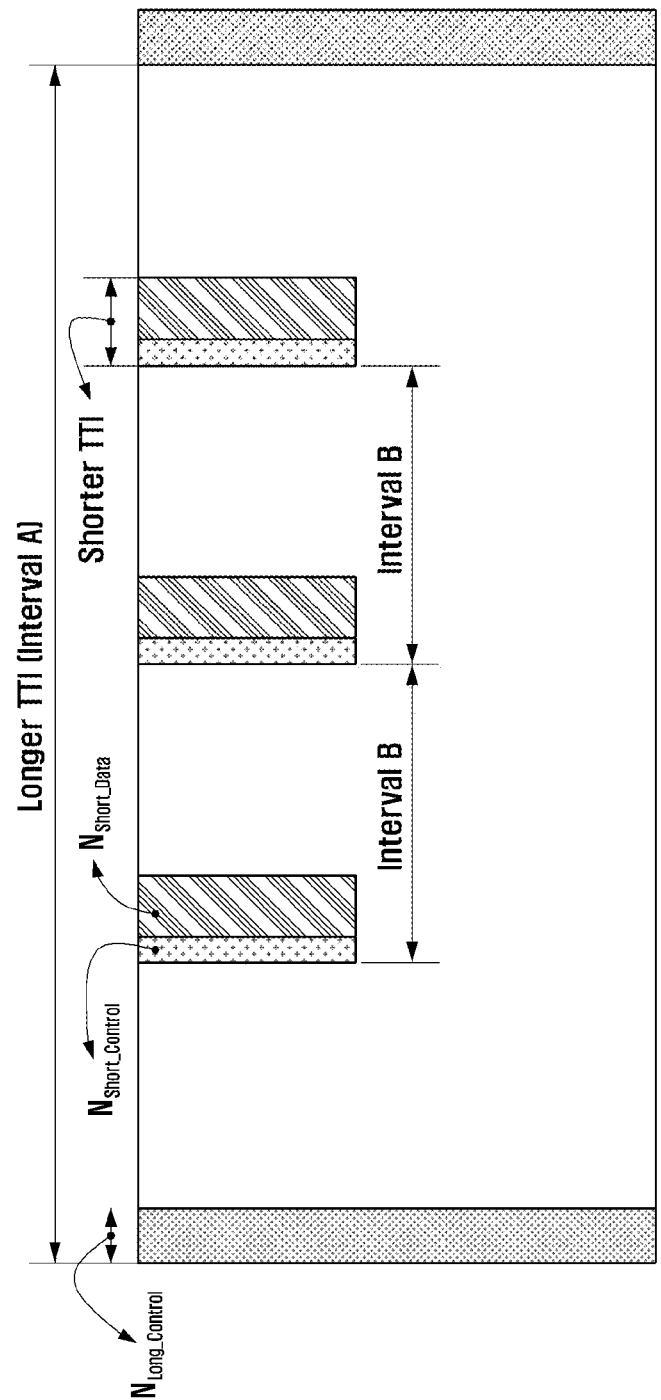
FIG. 16 illustrates yet another example of the downlink control channel transmission location of the terminal having the shorter TTI according to the embodiment of the present disclosure.

FIG. 16 illustrates yet another example of the downlink control channel transmission location of the terminal having the shorter TTI according to the embodiment of the present disclosure.

The difference between FIG. 16 and FIG. 14 is that the transmission location of the shorter TTI is fixed every TTI of the shorter TTI. In FIG. 14, since the transmission location of the shorter TTI is changed every TTI of the shorter TTI, the frequency diversity gain may be secured.

However, this method may not be preferable if the bandwidth of the terminal is restricted. For example, if the bandwidth of the longer TTI may support 100 MHz but the bandwidth of the shorter TTI may support only 20 MHz, the terminal needs to switch an RF every TTI to receive the PDCCH and data of the shorter TTI that is hopped on the frequency base.

Therefore, as illustrated in FIG. 16, the base station may transmit the PDCCH and the data of the shorter TTI using only a part of the entire bandwidth. In the combination of FIG. 16 and FIG. 14, the shorter TTI is transmitted in a part of the longer TTI as illustrated in FIG. 16, but the time-frequency hopping may be performed within the bandwidth of the shorter TTI as illustrated in FIG. 14.

Meanwhile, in the combination of FIG. 16 and FIG. 15, the shorter TTI is transmitted in a part of the longer TTI as illustrated in FIG. 16, but the same information may be transmitted within the bandwidth of the shorter TTI as illustrated in FIG. 15.

Another embodiment of FIG. 16 is the case where the bandwidth of the longer TTI and the bandwidth of the shorter TTI may different from each other. Therefore, as described in FIGS. 14 and 15, the PDCCH frequency resource location of the shorter TTI may use the previously promised pattern between the base station and the terminal or notify the frequency resource information for the PDCCH transmission of the shorter TTI in the $N_{Long\_control}$ region. If the PDCCH frequency resource information of the shorter TTI is notified in the $N_{Long\_control}$ region, all the PDCCH frequency resource information of the shorter TTI transmitted within the longer TTI may be notified (i.e., in FIG. 15, there are three shorter TTI PDCCHs within the longer TTI, and therefore all the information on three PDCCH frequency resources is notified). However, the method may be preferable because of the increased signaling overhead. Therefore, it is possible to notify the information on the frequency resource of the first shorter TTI PDCCH transmission in the $N_{Long\_Control}$ region, and use the promised pattern for the subsequent PDCCH transmission. As another example, the PDCCH monitoring interval information transmitted from the base station to the terminal may include the information on the PDCCH frequency resource location.

Figure 17:
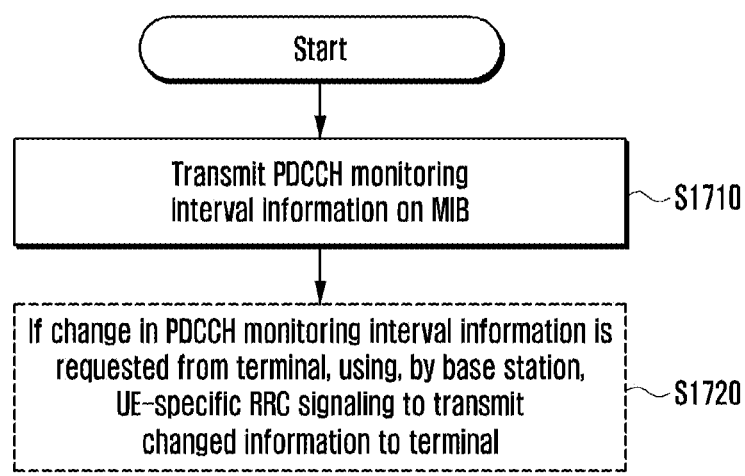
FIG. 17 illustrates a flow chart of an operation order of a base station according to an embodiment of the present disclosure.

FIG. 17 illustrates a flow chart of an operation order of a base station according to an embodiment of the present disclosure.

More specifically, FIG. 17 shows an operation of a base station for transmitting PDCCH monitoring information for receiving a PDCCH, and the base station transmits information on PDCCH monitoring to the MIB.

According to the embodiment of the present disclosure, if the longer TTI is expressed by a multiple of the shorter TTI, the information (or control channel monitoring information) on the PDCCH monitoring interval may include the information (interval information or second information) on how many the longer TTI is larger than the shorter TTI based on the shorter TTI and the offset information (first information) notifying the start point of the longer TTI based on SFN #0. In this case, the information on the PDCCH monitoring interval for the terminals using the shorter TTI is not transmitted, but the PDCCH monitoring interval information may be transmitted only to the terminals using the longer TTI. The above embodiment has been described in detail with reference to FIG. 8.

According to another embodiment of the present disclosure, the information on the PDCCH monitoring interval may include information on how the shorter TTI is made up of a fraction of the longer TTI based on the longer TTI and the offset information notifying the start point of the shorter TTI based on the SFN #0. In this case, the information on the PDCCH monitoring interval for the terminals using the longer TTI is not transmitted, but the PDCCH monitoring interval information may be transmitted only to the terminals using the shorter TTI. The above embodiment has been described in detail with reference to FIG. 9.

According to another embodiment of the present disclosure, the PDCCH monitoring interval information may be transmitted to all the terminals using the shorter TTI and the longer TTI. That is, the information on the PDCCH monitoring interval may include the offset information for the shorter TTI, the interval (duration) information corresponding to the shorter TTI, the offset information for the longer TTI, and the interval (duration) information corresponding to the longer TTI. The above embodiment has been described in detail with reference to FIG. 10.

According to another embodiment of the present disclosure, the shorter TTI and the longer TTI may use different bandwidths. For example, the shorter TTI may use the system bandwidth (or first bandwidth) and the longer TTI may use the reception bandwidth (or second bandwidth) of the terminal that is smaller than the system bandwidth. As another example, the longer TTI may use the system bandwidth and the shorter TTI may use the reception bandwidth of the terminal smaller than the system bandwidth. As another example, the longer TTI and the shorter TTI use different bandwidths. At this point, all the bandwidths may be the reception bandwidth of the terminal smaller than the system bandwidth. If the bandwidth used by the base station for the transmission of the longer TTI and the shorter TTI is different from the system bandwidth, the base station may transmit the PDCCH monitoring interval information including the bandwidth related information (including at least one of the reception bandwidth information and the frequency resource location). The bandwidth related information will be exemplified and described below.

According to the embodiment of the present disclosure, if the PDCCH monitoring interval information is transmitted only to the terminals using the longer TTI, the PDCCH monitoring interval information may include the bandwidth related information for the terminal using the longer TTI.

In addition, according to the embodiment of the present disclosure, if the PDCCH monitoring interval information is transmitted only to the terminals using the shorter TTI, the PDCCH monitoring interval information may include the bandwidth related information for the terminal using the shorter TTI.

In addition, according to the embodiment of the present disclosure, if the PDCCH monitoring interval information is transmitted to all the terminals using the shorter TTI and the longer TTI, the PDCCH monitoring interval information may include the bandwidth related information for all the terminals using the shorter TTI and the longer TTI.

According to the embodiment illustrated in FIG. 17, the PDCCH monitoring interval information described above may be transmitted through the master information block (MIB) in step 1710, and may be transmitted to the terminals using the shorter TTI within the cell and the longer TTI and all the terminals using the longer TTI within the cell.

If the base station (e.g., 5G NodeB (5GNB)) receives a request for a change in the PDCCH monitoring interval from the specific terminal as in step S1720, the base station may notify the terminal requesting the change in the PDCCH monitoring interval of the change in the PDCCH monitoring interval through the UE-specific RRC signaling.

It should be noted that the step S1720 may not necessarily be an essential component of the embodiment of the present disclosure, and may also be optionally applied.

Figure 18:
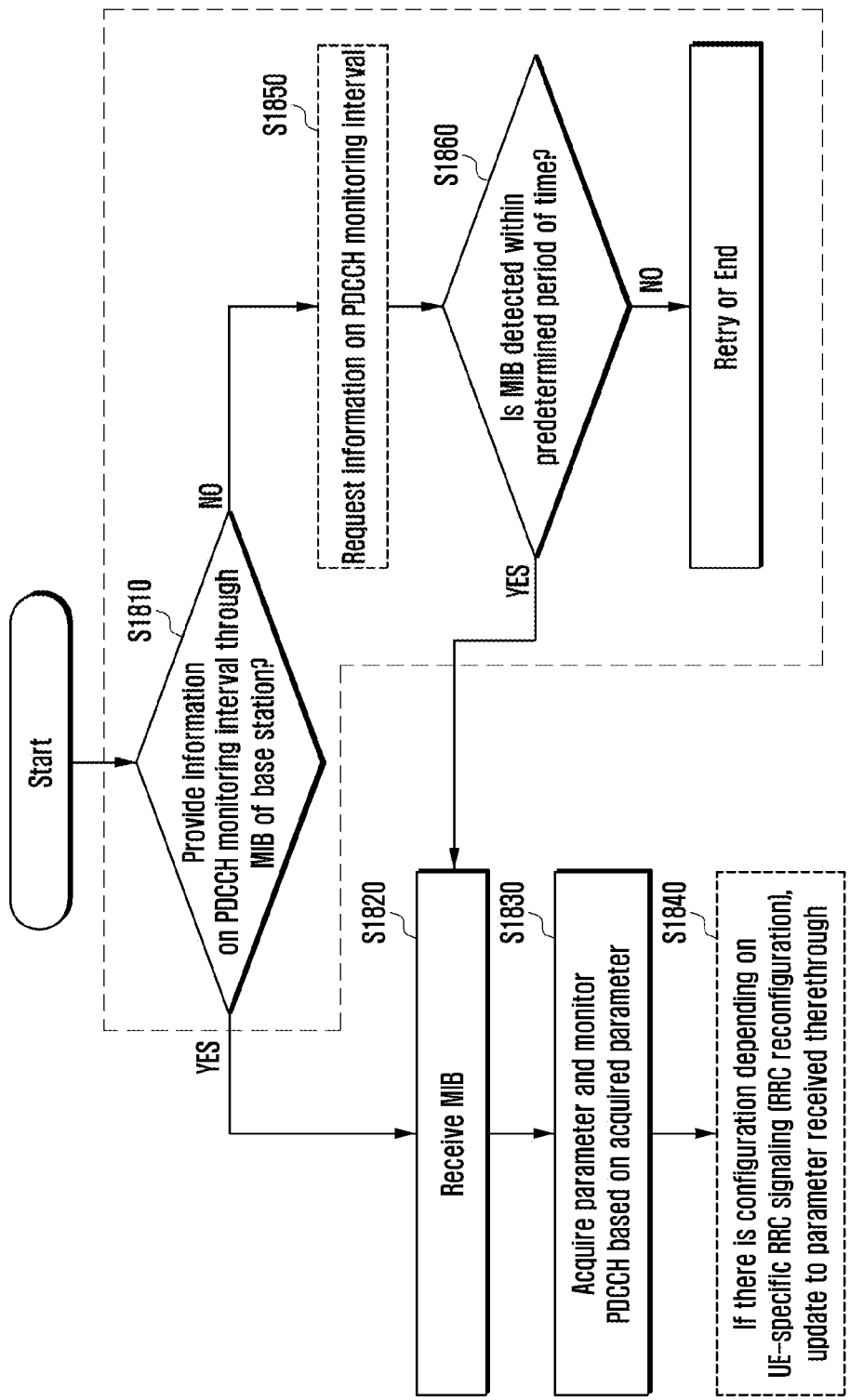
FIG. 18 illustrates a flow chart of an operation order of a terminal according to an embodiment of the present disclosure.

FIG. 18 illustrates a flow chart of an operation order of a terminal according to an embodiment of the present disclosure.

As illustrated in FIG. 18, in step S1810, if the base station transmits the information on the PDCCH monitoring interval (or control channel monitoring information) through the MIB in step S1810, the terminal proceeds to step S1820 to receive the MIB. In step S1830, the terminal receives the information on the PDCCH monitoring interval.

On the other hand, if the change in the PDCCH monitoring interval is requested from the base station through the UE-specific RRC signaling, in step S1840, the terminal may ignore the information on the PDCCH monitoring interval acquired from the MIB and may use the information on the PDCCH monitoring interval acquired through the UE-specific RRC signaling to receive the PDCCH.

On the other hand, the case where the base station does not transmit the information on the PDCCH monitoring interval through the MIB or the information on the PDCCH monitoring interval received from the base station through the MIB is not the information that the terminal wants (e.g., the case where the PDCCH monitoring of the longer period is required in consideration of the power consumption of the terminal) may occur.

In this case, in step S1850, the terminal may request a separate PDCCH monitoring interval to the base station. The terminal requesting the information on the PDCCH monitoring interval attempts to receive the MIB for a predetermined period of time in step S1860 and if the information on the PDCCH monitoring interval is changed in the MIB, through steps following the step S1820, the terminal may receive the information on the PDCCH monitoring interval and perform the PDCCH monitoring.

If the information on the PDCCH monitoring interval is not changed in the MIB after the information on the PDCCH monitoring interval of the terminal is requested, the terminal may re-request or stop the PDCCH monitoring interval change information.

Meanwhile, in the procedure illustrated in FIG. 18, it should be noted that a portion represented by a dotted line portion does not necessarily configure an essential feature of the embodiment of the present disclosure. For example, although it is described whether the base station transmits information on the PDCCH monitoring interval through the MIB in step S1810 of FIG. 18, the terminal may immediately proceed to step S1820 to attempt to receive the MIB.

According to another embodiment of the present disclosure, the shorter TTI and the longer TTI may use different bandwidths. For example, the shorter TTI may use the system bandwidth and the longer TTI may use the reception bandwidth of the terminal smaller than the system bandwidth. As another example, the longer TTI may use the system bandwidth and the shorter TTI may use the reception bandwidth of the terminal smaller than the system bandwidth. As another example, the longer TTI and the shorter TTI use different bandwidths. At this point, all the bandwidths may be the reception bandwidth of the terminal smaller than the system bandwidth. If the bandwidth used by the base station for the transmission of the longer TTI and the shorter TTI is different from the system bandwidth, the base station may transmit the PDCCH monitoring interval information including the information on the reception bandwidth.

In particular, if the reception bandwidth for the PDCCH monitoring differs depending on each service or the capability of the terminal, a restriction may occur when the terminal requests the information on the PDCCH monitoring interval to the base station in step S1850. For example, assume that the system bandwidth is 20 MHz and the transmission bandwidth depending on a specific service or capability of a specific terminal is 5 MHz smaller than 20 MHz. If the terminal requests the PDCCH monitoring interval transmission in step S1850, it may not know from which location of 20 MHz the PDCCH monitoring interval should be requested.

In order to solve the above problem, the PDCCH monitoring interval information request transmitted by the terminal may be transmitted at the previously promised location. For example, the base station may cell-specifically transmit the information to the terminal through the MIB or SIB. That is, the terminal receiving the MIB and the SIB may acquire the information on the frequency resource and the transmission bandwidth for the request of the PDCCH monitoring interval information. In another example, the terminal may perform the request of the PDCCH monitoring interval information depending on the frequency resource and the transmission bandwidth that are previously promised by the base station and the terminal.

Figure 19:
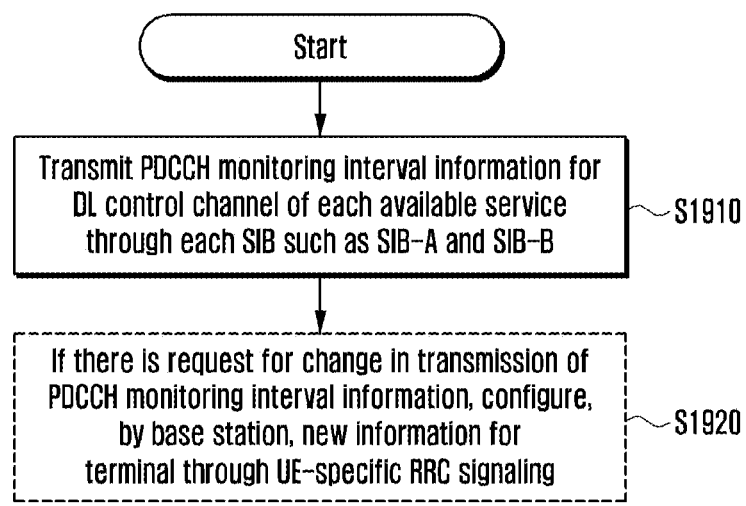
FIG. 19 illustrates a flow chart of the operation order of the base station according to the embodiment of the present disclosure.

FIG. 19 illustrates a flow chart of the operation order of the base station according to the embodiment of the present disclosure.

The difference between FIG. 19 and FIG. 17 is that in step S1910, the base station does not transmit the information on the PDCCH monitoring interval through the MIB, but transmit the information on the PDCCH monitoring interval through the SIB. In the present embodiment, the SIB may be defined for each TTI, and the information on the PDCCH monitoring interval may be included in each SIB.

For example, assume that the SIB supporting the TTI-A is the SIB-A (or first system information) and the SIB supporting the TTI-B is the SIB-B (or second system information). The SIB-A may transmit the offset A (or first offset information) and the interval A (or first interval information) for the TTI-A and the SIB-B transmits the offset B (or second Offset information) and interval B (or second interval information) for the TTI-B.

As another example, if the TTI-A is a multiple of TTI-B or the TTI-B is a multiple of TTI-A (i.e., if the TTI-A is divided by the TTI-B) as described with reference to FIG. 15, the information on the offset and the interval for either the TTI-A or the TTI-B may be transmitted in the SIB.

At this time, since the SIB-A and the SIB-B may be transmitted at different periods, the terminal needs to know the period of the SIB (or the PDCCH monitoring interval for decoding the SIB) in order to decode different SIBs. To this end, the default PDCCH monitoring interval (default control channel monitoring interval) may be promised between the base station and the terminal. For example, it may be defined that the PDCCH monitoring is performed every N ms before the terminal decodes the SIB-A and the SIB-B to acquire the PDCCH monitoring interval information. N which is a fixed value may be embedded in the base station and the terminal, or an N value may be specified in the MIB.

Meanwhile, if the base station (5GNB: 5G NodeB) receives a request for a change in the PDCCH monitoring interval from the specific terminal as in step S1720 of FIG. 17, the base station may notify the terminal requesting the change in the PDCCH monitoring interval of the change in the PDCCH monitoring interval through the UE-specific RRC signaling.

According to another embodiment of the present disclosure, the shorter TTI and the longer TTI may use different bandwidths. For example, the shorter TTI may use the system bandwidth and the longer TTI may use the reception bandwidth of the terminal smaller than the system bandwidth. As another example, the longer TTI may use the system bandwidth and the shorter TTI may use the reception bandwidth of the terminal smaller than the system bandwidth. As another example, the longer TTI and the shorter TTI use different bandwidths. At this point, all the bandwidths may be the reception bandwidth of the terminal smaller than the system bandwidth. If the bandwidth used by the base station for the transmission of the longer TTI and the shorter TTI is different from the system bandwidth, the base station may transmit the PDCCH monitoring interval information including the information on the reception bandwidth.

For example, assume that the SIB supporting the TTI-A is the SIB-A (or first system information) and the SIB supporting the TTI-B is the SIB-B (or second system information). The SIB-A may transmit the offset A (or first offset information), the interval A (or first interval information), a bandwidth part A (or first transmission bandwidth), and a first frequency resource location for the TTI-A and the SIB-B may transmit the offset B (or second offset information), the interval B (or second interval information), a bandwidth part B (or second transmission bandwidth), and a second frequency resource location for the TTI-B.

At this time, since the SIB-A and the SIB-B may be transmitted at different frequency resource locations and different transmission bandwidths, the terminal needs to know the period of the SIB, the frequency resource location, and the transmission bandwidth (or the PDCCH monitoring interval for decoding the SIB) in order to decode different SIBs. To this end, the default PDCCH monitoring interval (default control channel monitoring interval) may be promised between the base station and the terminal. In this case, the default PDCCH monitoring interval for the SIB-A and the default PDCCH monitoring interval for the SIB-B may each exist for the default PDCCH monitoring interval. The two intervals described above may be the same or different. If the two intervals are the same, the first interval information, the second interval information, the first bandwidth related information, and the second bandwidth related information all may be transmitted together in one SIB.

Figure 22:
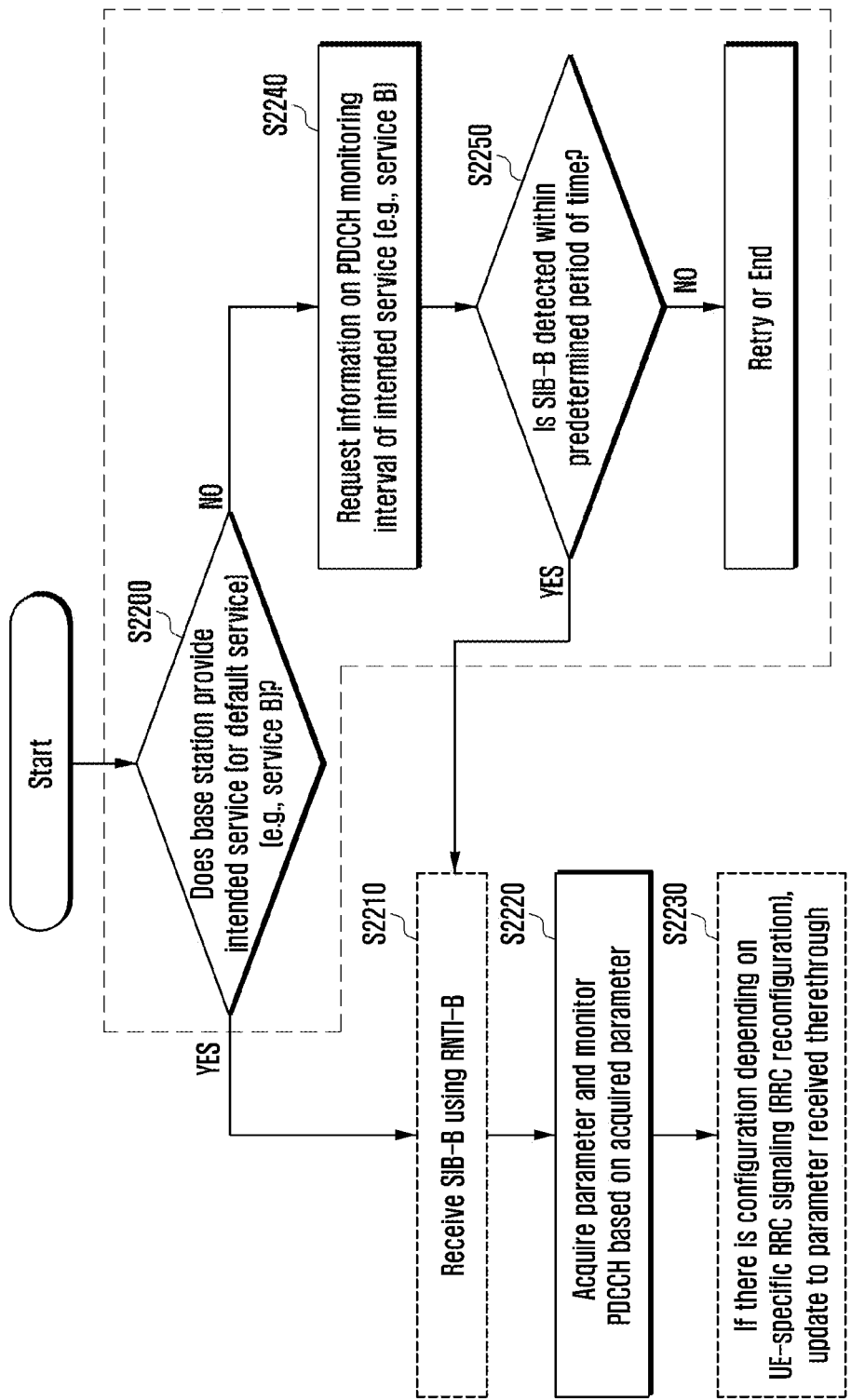
FIG. 22 illustrates a flow chart of the operation order of the terminal according to the embodiment of the present disclosure.

For example, the SIB-A may be defined to perform the PDCCH monitoring in the bandwidth of $K_A$ MHz at a specific frequency resource location every $N_A$ ms before the terminal decodes the SIB-A and the SIB-B, respectively, to acquire the PDCCH monitoring interval information, and the SIB-B may be defined to perform the PDCCH monitoring in a bandwidth of $K_B$ MHz at a specific frequency resource location every $N_A$ ms. $N_A$ and $N_B$ may be different from each other, and $K_A$ and $K_B$ may use different values. $N_A$, $N_B$, $K_A$, and $K_B$ which are fixed values are embedded in the base station and the terminal, or $N_A$, $N_B$, $K_A$, and $K_B$ values and the frequency resource locations may be specified in the MIB. Meanwhile, the SIB-A and the SIB-B may use the same N and K values. That is, $N_A=N_B=N$ and $K_A=K_B=K$. As described above, if the PDCCH monitoring is performed in a bandwidth of K MHz at a specific frequency resource location every N ms, the scheduling information for the SIB may be obtained, and the terminal may acquire the corresponding SIB based on the acquired scheduling information FIG. 22 illustrates a flow chart of the operation order of the terminal according to the embodiment of the present disclosure.

First, in step S2010, if the base station transmits the information on the PDCCH monitoring interval through the SIB, the terminal may receive the SIB using an arbitrary radio identifier (e.g., X-RNTI) in step S2020 and receive (or acquire) the information on the PDCCH monitoring interval in step S2030.

If the change in the PDCCH monitoring interval is requested from the base station through the UE-specific RRC signaling, in step S2040, the terminal may ignore the information on the PDCCH monitoring interval acquired from the SIB and may use the information on the PDCCH monitoring interval acquired through the UE-specific RRC signaling to receive the PDCCH.

Meanwhile, if the base station does not transmit the information on the PDCCH monitoring interval through the SIB or the information on the PDCCH monitoring interval received from the base station through the SIB is not the information that the terminal wants (e.g., if the PDCCH monitoring of a longer period is required in consideration of the power consumption of the terminal), or if there is no information on the desired PDCCH monitoring interval in the SIB transmitted by the base station (e.g., if the base station transmits the SIB-A and the SIB-B but the terminal requires the SIB-C), the terminal may request a separate PDCCH monitoring interval to the base station in step S2050. At this time, it is assumed that different TTIs are transmitted through different SIBs, and each SIB may be decoded through different RNTIs. That is, the SIB-A may be decoded with the RNTI-A and the SIB-B may be decoded with the RNTI-B. The RNTI information may be embedded in the base station terminal or the base station may notify the terminal of the RNTI value through another cell-specific system information.

In step S2060, the terminal requesting the information on the PDCCH monitoring interval attempts to receive the SIB for a predetermined period of time and if the information on the PDCCH monitoring interval is changed in the SIB, steps following the step S2020 are performed to receive the information and performs the PDCCH monitoring.

If the information on the PDCCH monitoring interval is not changed in the SIB after the request of the terminal, the terminal re-requests or stops the PDCCH monitoring interval change information. If the service (or TTI) that the terminal wants is A, the PDCCH monitoring interval that the terminal wants may be transmitted to the SIB-A, and therefore the reception of other SIBs (e.g., SIB-B and SIB-C) is not performed.

Figure 20:
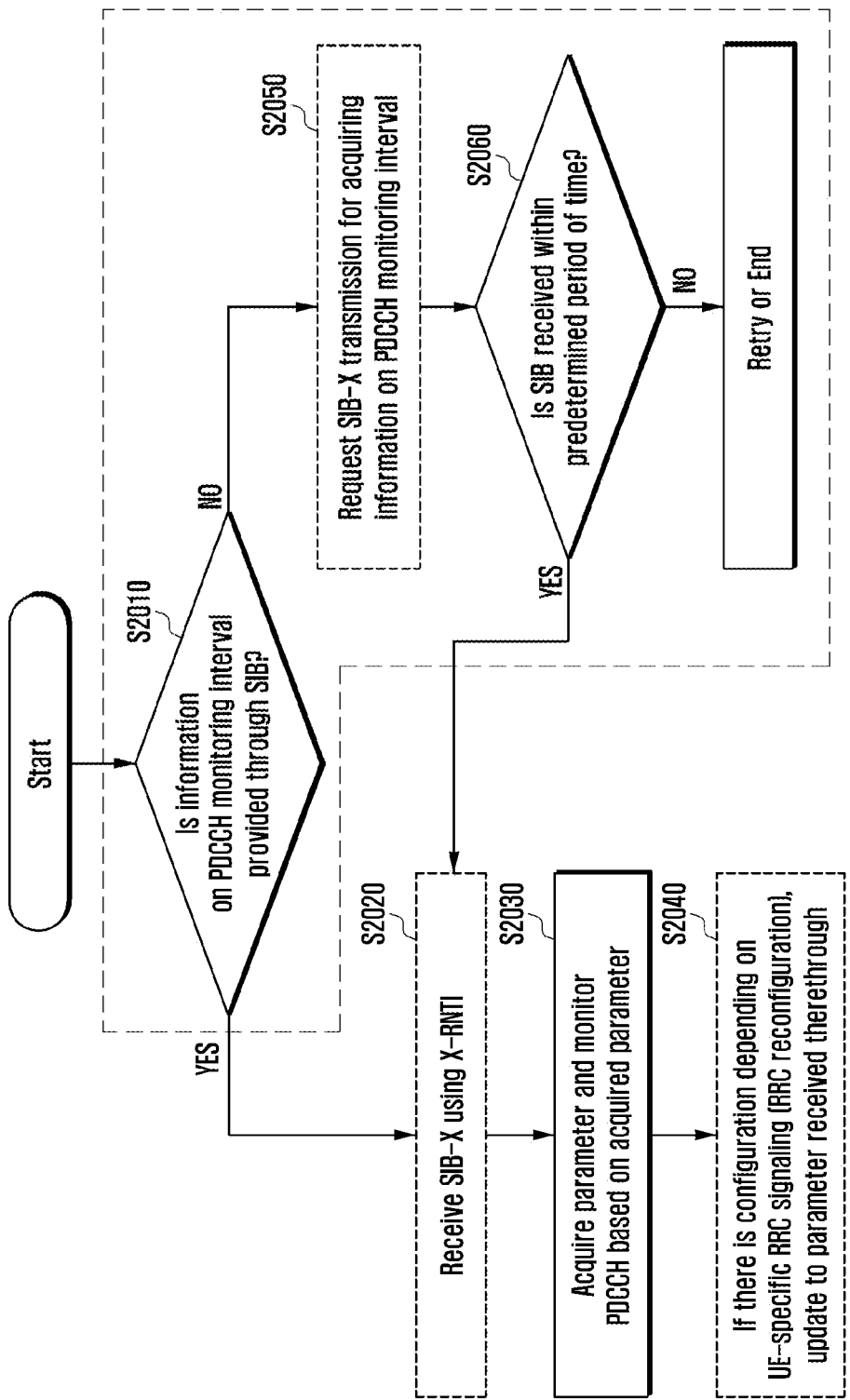
FIG. 20 illustrates a flow chart of the operation order of the terminal according to the embodiment of the present disclosure.

Meanwhile, in the procedure illustrated in FIG. 20, it should be noted that a portion represented by a dotted line portion does not necessarily configure an essential feature of the embodiment of the present disclosure. For example, although it is described whether the base station transmits information on the PDCCH monitoring interval through the SIB in step S2010 of FIG. 20, the terminal may immediately proceed to step S2020 to attempt to receive the SIB.

Figure 21:
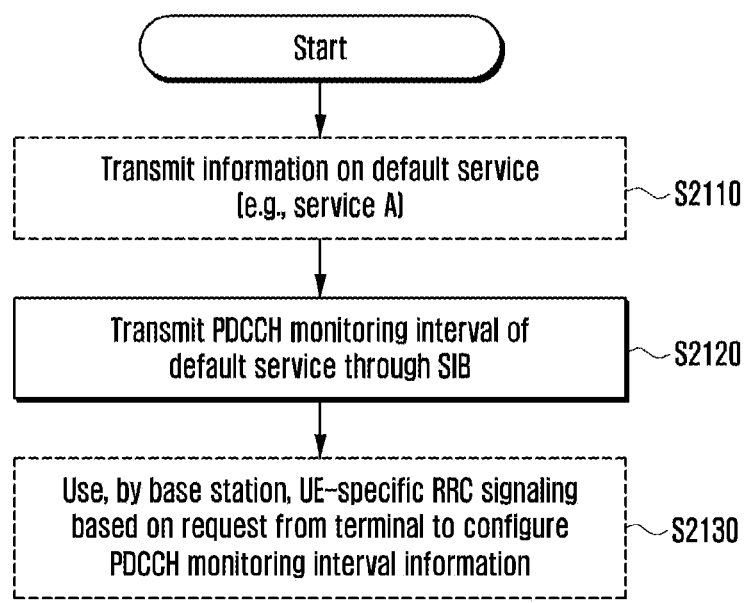
FIG. 21 illustrates a flow chart of the operation order of the terminal according to the embodiment of the present disclosure.

FIG. 21 illustrates a flow chart of the operation order of the base station according to the embodiment of the present disclosure.

The difference between FIG. 21, FIG. 17 and FIG. 19 is that in step S2110, the base station transmits to the MIB what the information on the default service (or the default TTI) served by the base station is.

For example, the MIB transmitted by the base station may include the information on the eMBB or the mMTC as the default service or the information on the eMBB TTI or the information on the mMTC TTI as the default TTI.

The information on the default service may be included in the MIB as follows. If a specific bit of the MIB transmitted by the base station is "00", "00" means that the corresponding base station supports only the eMBB service, and if the specific bit is "01", "01" may indicate that the corresponding base station supports only the URLL service.

In addition, the information on the default TTI may be included in the MIB as follows. If a specific bit of the MIB transmitted by the base station is "00", "00" means that the corresponding base station supports only the default TTI-A, and if the specific bit is "01", "01" may indicate that the corresponding base station supports only the default TTI-B. The method of configuring the specific bit may be various, and follows the number of TTIs or services supported by 5G. For example, if three different TTIs (or three different services) are supported, the specific bit may consist of 2 bits.

In step S2120, the base station may transmit the PDCCH monitoring interval information of the default service through the SIB. At this time, the PDCCH monitoring interval information of the default service may include the PDCCH frequency resource and the reception bandwidth. For this purpose, the base station and the terminal may have the previously promised bandwidth and frequency resource location for receiving the PDCCH monitoring interval information of the default service. A terminal that knows what the default service (or default TTI) supported by the base station through the MIB is may skip the reception of the SIB corresponding to another service (or TTI). For example, if the default service supported by the base station is A (or if the default TTI is the TTI-A), since the base station transmits the SIB-A, the base station transmits the PDCCH monitoring interval information for the default service A (or default TTI) to the SIB-A.

On the other hand, if information on an additional service (e.g., service B and service C) or additional TTI (e.g., TTI-B and TTI-C) is requested from a specific terminal as in step S2130, the PDCCH monitoring interval may be additionally notified to the terminal requesting the information through UE-specific RRC signaling.

FIG. 22 illustrates a flow chart of the operation order of the terminal according to the embodiment of the present disclosure.

First, the terminal may acquire the information on the default service (or default TTI) of the base station through the MIB transmitted by the base station.

If the base station transmits the PDCCH monitoring interval information for the default service (or the default TTI) through the MIB in step S2200, the terminal proceeds to step S2210 to receive the SIB using an arbitrary radio identifier (e.g., RNTI-B) and receive the information on the PDCCH monitoring interval in step S2220.

In this case, the terminal knows what the default service (or default TTI) supported by the base station through the MIB, and therefore the reception of the SIB corresponding to another service (or TTI) may be skipped.

If the change in the PDCCH monitoring interval is requested from the base station through the UE-specific RRC signaling, in step S2230, the terminal may ignore the information on the PDCCH monitoring interval acquired from the SIB and may use the information on the PDCCH monitoring interval acquired through the UE-specific RRC signaling to receive the PDCCH.

Meanwhile, if the information on the PDCCH monitoring interval received from the base station through the SIB is not information (e.g., if the PDCCH monitoring of a longer period is required in consideration of power consumption of the terminal) that the terminal wants or the SIB transmitted by the base station does not have the information on the PDCCH monitoring interval that the terminal wants (e.g., if the base station transmits the PDCCH monitoring interval information for the default value to the SIB-A, but the terminal is the PDCCH monitoring interval information corresponding to the service B, the service C, or the TTI-B, and the TTI-C is required), the terminal may request the separate PDCCH monitoring interval to the base station in step S2240.

In step S2250, the terminal requesting the information on the PDCCH monitoring interval attempts to receive the SIB for a predetermined period of time and if the information on the PDCCH monitoring interval is changed in the SIB, steps following the step S2210 are performed to receive the information and performs the PDCCH monitoring.

If the information on the PDCCH monitoring interval is not changed in the SIB after the request of the terminal, the terminal re-requests or stops the PDCCH monitoring interval change information.

Meanwhile, if the terminal requests PDCCH monitoring interval information as illustrated in FIG. 22, the base station may not transmit the PDCCH monitoring interval information through the SIB and may transmit the PDCCH monitoring interval information through the UE-specific RRC signaling.

Figure 23:
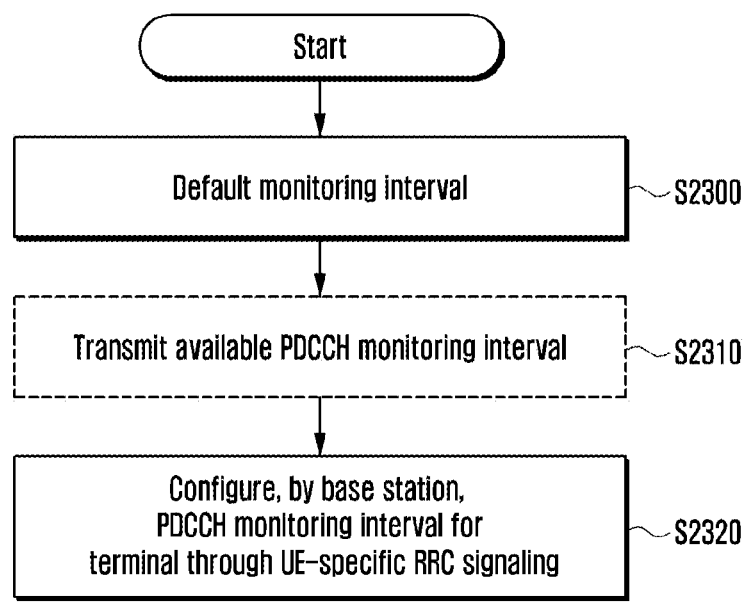
FIG. 23 illustrates a flow chart of the operation order of the base station according to the embodiment of the present disclosure.

FIG. 23 illustrates a flow chart of the operation order of the base station according to the embodiment of the present disclosure.

The difference from FIG. 23, FIG. 19, FIG. 21, and FIG. 22 is that it is assumed that there is the information on the default PDCCH monitoring interval previously promised between the base station and the terminal. Accordingly, the base station may not perform separate signaling for the PDCCH monitoring interval to the terminal through the MIB or the SIB.

In this case, the terminal monitors the PDCCH based on the default information (i.e., there is the default PDCCH monitoring interval) and acquires the SIB-X information. At this time, the terminal uses RNTI-X to acquire the SIB-X information, and the RNTI-X may use the value promised between the base station and the terminal. The terminal may perform the PDCCH monitoring using the above-mentioned default PDCCH monitoring interval information (activation of the PDCCH monitoring interval) before the terminal receives information on a new PDCCH monitoring interval from the base station after RRC Connection Setup. In addition, the base station may change or reset the previously configured PDCCH monitoring interval information through the UE-specific RRC signaling after the RRC Connection Setup. At this time, a reset may mean using the default PDCCH monitoring interval information (deactivation).

In another example, the base station may update the default PDCCH monitoring interval through the SIB. That is, the base station transmits the PDCCH monitoring interval through the SIB as in step S2310, and the terminal may receive the SIB using the default PDCCH monitoring interval prior to receiving the PDCCH monitoring interval information from the base station in step S2310. The terminal receiving the SIB may monitor the PDCCH transmitted before the RRC connection setup using the PDCCH monitoring interval included in the SIB. For example, in the random access process, the terminal may use the information to monitor the PDCCH for Msg2 reception from the base station. In another example, the terminal may use the information to monitor the PDCCH for Msg4 reception from the base station.

Meanwhile, the base station may inform the terminal of information on another PDCCH monitoring interval through the UE-specific RRC signaling as in step S2320. At this time, the configuration of another PDCCH monitoring interval may be made by the request of the terminal, or may be made by the determination of the base station. As an example of the case where the configuration of another PDCCH monitoring interval is made by the request of the terminal, the terminal may request the base station to change the PDCCH monitoring value in order to reduce the terminal's own battery consumption. The request may be made through a MAC CE or a higher layer message. The base station receiving the same may configure a new PDCCH monitoring interval for the terminal (activation). Alternatively, the terminal having a good battery condition may notify the base station of the configuration, and the base station can re-configure the change in the PDCCH monitoring value based on the notification. In this case, the change may mean the use of the previously used default PDCCH monitoring interval information or the use of the previously configured PDCCH monitoring interval information (deactivation).

If the base station itself performs the determination and configures the PDCCH monitoring interval information without the request of the terminal, the base station may use various determination conditions. For example, the base station may perform scheduling and load balancing to optimize the capacity of the PDCCH using the bandwidth capability or the category information of the terminals connected to the base station and the number of connected terminals. It may be based on the requirements that each traffic needs to support as the determination condition of another base station. For example, in the case of the traffic requesting the low latency, the PDCCH monitoring interval may be reduced on the time base, and in the case of the traffic in which the requirement for the latency is not large, the PDCCH monitoring interval may be taken longer on the time base.

Figure 24:
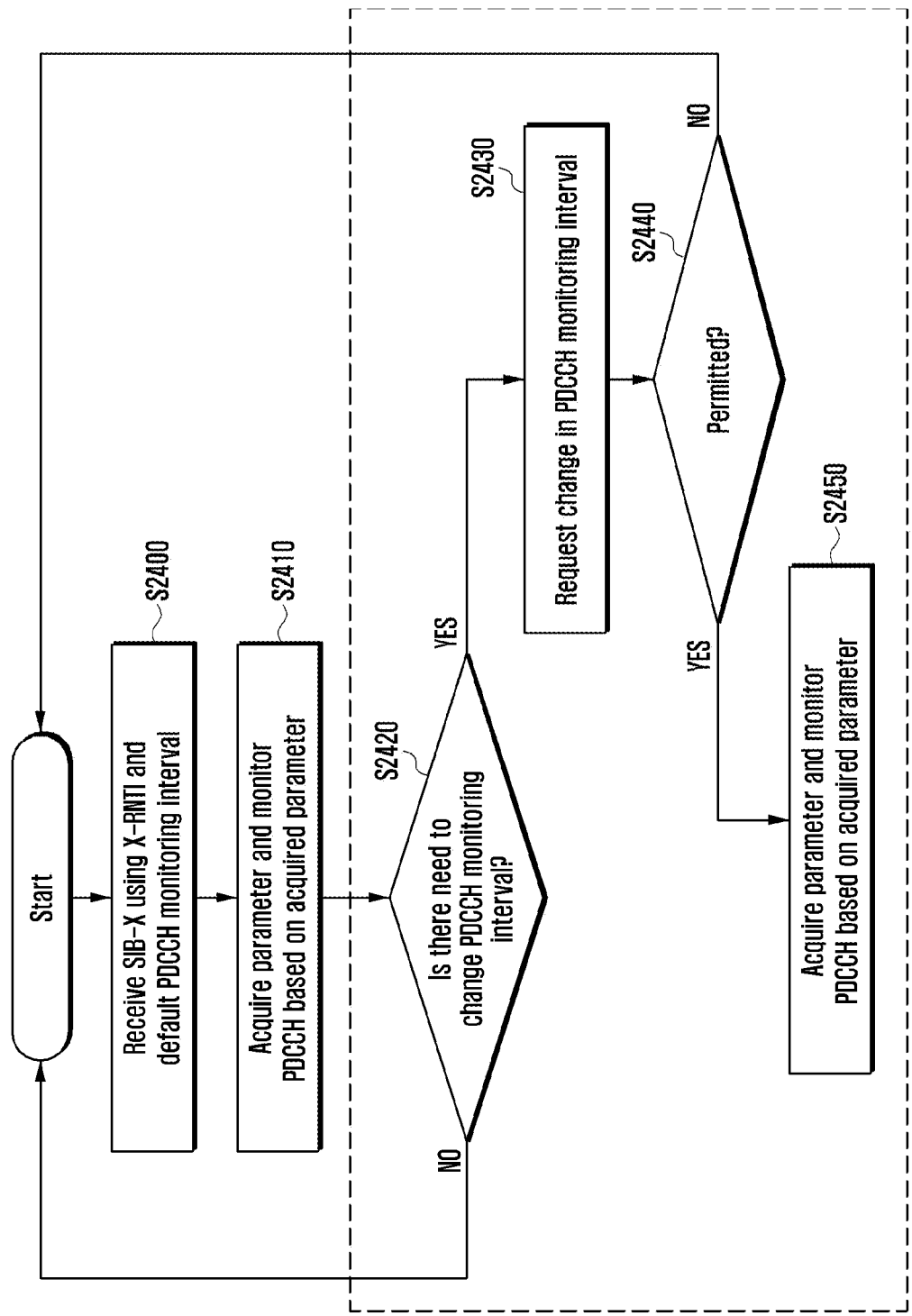
FIG. 24 illustrates a flow chart of the operation order of the terminal according to the embodiment of the present disclosure.

FIG. 24 illustrates a flow chart of the operation order of the terminal according to the embodiment of the present disclosure.

First, in step S2400, the terminal may receive (SIB-X) the SIB using the embedded default PDCCH monitoring interval, and receive the UE-specific DCI. In another example, if the information on the PDCCH monitoring interval is configured through the SIB, the terminal receives the information on the PDCCH monitoring interval in step S2410. Then, the terminal may monitor the PDCCH using the information on the new PDCCH monitoring interval configured through the SIB, instead of the information on the default PDCCH monitoring.

Later, the terminal determines whether it is necessary to change the PDCCH monitoring value as in step S2420. For example, considering the power consumption of the terminal, it may be determined whether the PDCCH monitoring of a longer period is required or a change in a frequency bandwidth part for monitoring the PDCCH, or the like is required.

If it is determined that the PDCCH monitoring value needs to be changed, the terminal may request the base station to change the PDCCH monitoring value in step S2430. To support the operation, the base station may notify the terminal of RNTI values (e.g., RNTI-A and RNTI-B) and the PDCCH monitoring information that the base station may support through the cell-specific or UE-specific RRC signaling.

If the terminal requests the base station to change the PDCCH monitoring interval and the change in the PDCCH monitoring interval is permitted from the base station through the cell-specific or UE-specific RRC signaling as in step S2440, the terminal may ignore the default PDCCH monitoring interval previously promised with the base station or ignore the information on the PDCCH monitoring interval acquired from the SIB-X (if the base station transmits the information on the PDCCH monitoring interval through the SIB), and receive the PDCCH using information on a new PDCCH monitoring interval acquired through the various signaling methods as described above.

Meanwhile, in the description of FIG. 24, steps following the step S2420 of changing the PDCCH monitoring value according to the request of the terminal may be optional components instead of the essential components of the present disclosure.

Figure 25:
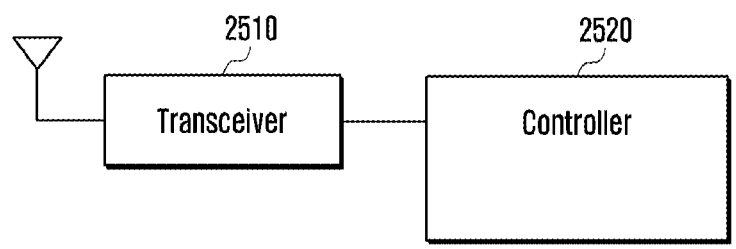
FIG. 25 illustrates an internal structure of the base station according to the embodiment of the present disclosure.

FIG. 25 illustrates an internal structure of the base station according to the embodiment of the present disclosure.

As illustrated in FIG. 25, the base station according to the embodiment of the present disclosure may include a transceiver 2510 and a controller 2520.

The transceiver 2510 may transmit and receive a signal to and from the terminal. In this case, the terminal may include at least one of the first terminal using the first transmission time interval (TTI) or the second terminal using the second TTI. The signal transmitted and received to and from the terminal may include the control signal and the data.

The controller 2520 may control various signal flows so that the base station may perform the embodiment of the present disclosure.

The controller 2520 may control a series of processes of generating the control channel monitoring information for monitoring the control channel of at least one of the first terminal using the first transmission time interval (TTI) or the second terminal using the second TTI and transmitting the control channel monitoring information.

In this case, the control channel monitoring information includes the offset information and the interval information, and the offset information and the interval information may be used to determine the timing and the resource location when and where the first terminal or the second terminal monitors the control channel.

In addition, the control channel monitoring information may be transmitted through the master information block (MIB), the system information block (SIB), or the UE-specific signaling.

In addition, if the control channel monitoring information is transmitted through the SIB, at least one of the first SIB for the first TTI and the second SIB for the second TTI may be transmitted through the SIB.

In addition, the controller 2520 performs a control to transmit at least one of the default service information or the default TTI information supported by the base station, and the default service information or the default TTI information is used to receive the SIB of the terminal.

In addition, if receiving the request for the change in the control channel monitoring information from any one of the first terminal or the second terminal, the controller 2520 may perform a control to transmit the changed control channel monitoring information to the terminal requesting the change.

In addition to the above features, the controller 2520 may control various signal flows to perform the embodiments of the present disclosure described above. For example, the controller 2520 may control the signal flow so as to perform the procedure illustrated in FIG. 11 or the like which transmits a plurality of transport blocks within one TTI.

Figure 26:
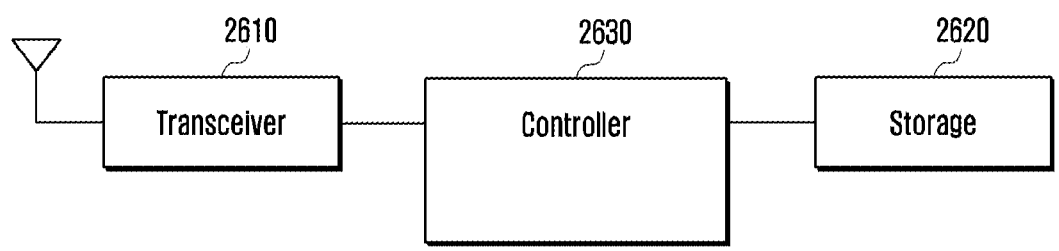
FIG. 26 illustrates an internal structure of the terminal according to the embodiment of the present disclosure.

FIG. 26 illustrates an internal structure of the terminal according to the embodiment of the present disclosure.

As illustrated in FIG. 26, the terminal according to the embodiment of the present disclosure may include a transceiver 2610, a storage 2620, and a controller 2630.

The transceiver 2610 may transmit and receive a signal to and from the base station. In this case, the signal may include the control signal and the data.

The storage 2620 may store various programs and the like so that the terminal may be operated according to the embodiment of the present disclosure.

The controller 2630 may control the signal flow between the respective blocks so that the terminal may be operated according to the embodiment of the present disclosure.

The controller 2630 may perform a control to receive, from the base station, the control channel monitoring information including the offset information and the interval information which is used to determine the timing and the resource location when and where the control channel is monitored and monitor the control channel based on the received control channel monitoring information.

In this case, at least one of the first terminal may include at least one of the first terminal using the first transmission time interval (TTI) or the second terminal using the second TTI may include the control channel monitoring information.

In addition, the control channel monitoring information may be received through the master information block (MIB), the system information block (SIB), or the UE-specific signaling.

In addition, when the control channel monitoring information is received through the SIB, the controller 2630 may perform a control to receive the SIB using an arbitrary radio identifier for receiving the control channel monitoring information.

In addition, the controller 2630 may perform a control to receive, from the base station, at least one of the default service information and the default TTI information supported by the base station and receive the SIB based on at least one of the default service information and the default TTI information.

In addition, the controller 2630 may perform a control to transmit the request for changing the control channel monitoring information to the base station and receive the changed control channel monitoring information transmitted from the base station in response to the request.

According to various embodiments of the present disclosure, in the scenario where various services having different requirements coexist in one system, the terminal may efficiently receive the downlink control channel corresponding to the terminal's own service.

The embodiments of the present disclosure disclosed in the present specification and the accompanying drawings have proposed specific examples in order to easily describe the contents of the present disclosure and assist in understanding the present disclosure and do not limit the scope of the present disclosure. It is obvious to those skilled in the art to which the present disclosure pertains that various modifications may be made without departing from the scope of the present disclosure, in addition to the embodiments disclosed herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a system information block (SIB) including information on a default frequency resource;
   receiving, from the base station, a configuration message for configuring a plurality of frequency resources, each of the plurality of frequency resources being configured within one cell;
   receiving, from the base station, a control message indicating an activation of a frequency resource from among the plurality of frequency resources;
   monitoring a first downlink control channel on the frequency resource indicated by the control message;
   deactivating the frequency resource indicated by the control message and changing from the frequency resource indicated by the control message to the default frequency resource; and
   monitoring a second downlink control channel on the default frequency resource.

2. The method of claim 1, further comprising receiving, from the base station, data on the default frequency resource based on the second downlink control channel.

3. The method of claim 1, wherein at least one frequency resource other than the frequency resource indicated by the control message is deactivated.

4. The method of claim 1, wherein the second downlink control channel is located at least one symbol from a first symbol of a slot.

5. A method performed by a base station in a wireless communication system, the method comprising:
   transmitting a system information block (SIB) including information on a default frequency resource;
   transmitting, to a terminal, a configuration message for configuring a plurality of frequency resources, each of the plurality of frequency resources being configured within one cell;
   transmitting, to the terminal, a control message indicating an activation of a frequency resource from among the plurality of frequency resources;
   transmitting, to the terminal, a first downlink control channel on the frequency resource indicated by the control message; and
   transmitting, to the terminal, a second downlink control channel on the default frequency resource, wherein the frequency resource indicated by the control message is deactivated and changed to the default frequency resource.

6. The method of claim 5, further comprising transmitting, to the terminal, data on the default frequency resource according to the second downlink control channel.

7. The method of claim 5, wherein at least one frequency resource other than the frequency resource indicated by the control message is deactivated.

8. The method of claim 5, wherein the second downlink control channel is located at least one symbol from a first symbol of a slot.

9. A terminal in a wireless communication system, the terminal comprising:
   a transceiver; and
   a controller configured to:
      receive, from a base station via the transceiver, a system information block (SIB) including information on a default frequency resource,
      receive, from the base station via the transceiver, a configuration message for configuring a plurality of frequency resources, each of the plurality of frequency resources being configured within one cell,
      receive, from the base station via the transceiver, a control message indicating an activation of a frequency resource from among the plurality of frequency resources,
      monitor a first downlink control channel on the frequency resource indicated by the control message,
      deactivate the frequency resource indicated by the control message and change from the frequency resource indicated by the control message to the default frequency resource, and
      monitor a second downlink control channel on the default frequency resource.

10. The terminal of claim 9, wherein the controller is further configured to receive, from the base station via the transceiver, data on the default frequency resource based on the second downlink control channel.

11. The terminal of claim 9, wherein at least one frequency resource other than the frequency resource indicated by the control message is deactivated.

12. The terminal of claim 9, wherein the second downlink control channel is located at least one symbol from a first symbol of a slot.

13. A base station in a wireless communication system, the base station comprising:
a transceiver; and
a controller configured to:
transmit, via the transceiver, a system information block (SIB) including information on a default frequency resource,
transmit, to a terminal via the transceiver, a configuration message for configuring a plurality of frequency resources, each of the plurality of frequency resources being configured within one cell,
transmit, to the terminal via the transceiver, a control message indicating an activation of a frequency resource from among the plurality of frequency resources,
transmit, to the terminal via the transceiver, a first downlink control channel on the frequency resource indicated by the control message, and
transmit, to the terminal, a second downlink control channel on the default frequency resource, wherein the frequency resource indicated by the control message is deactivated and changed to the default frequency resource.

14. The base station of claim 13, wherein the controller is further configured to transmit, to the terminal via the transceiver, data on the default frequency resource according to the second downlink control channel.

15. The base station of claim 13, wherein at least one frequency resource other than the frequency resource indicated by the control message is deactivated.

16. The base station of claim 13, wherein the second downlink control channel is located at least one symbol from a first symbol of a slot.

* * * * *